Nov. 15, 1966 C. BANCROFT 3,285,503

FLUID DISPLACEMENT DEVICE

Filed March 18, 1965 17 Sheets-Sheet 1

INVENTOR.
CHARLES BANCROFT
BY
Kenyon & Kenyon
ATTORNEYS

Nov. 15, 1966 C. BANCROFT 3,285,503

FLUID DISPLACEMENT DEVICE

Filed March 18, 1965 17 Sheets-Sheet 2

INVENTOR.
CHARLES BANCROFT
BY Kenyon & Kenyon
ATTORNEYS

Nov. 15, 1966 C. BANCROFT 3,285,503

FLUID DISPLACEMENT DEVICE

Filed March 18, 1965 17 Sheets-Sheet 3

INVENTOR.
CHARLES BANCROFT
BY
Kenyon & Kenyon
ATTORNEYS

FLUID DISPLACEMENT DEVICE

Filed March 18, 1965 17 Sheets-Sheet 4

INVENTOR.
CHARLES BANCROFT
BY
Kenyon & Kenyon
ATTORNEYS

INVENTOR
CHARLES BANCROFT
BY
Kenyon & Kenyon
ATTORNEYS

INVENTOR.
CHARLES BANCROFT
BY Kenyon & Kenyon
ATTORNEYS

INVENTOR.
CHARLES BANCROFT
BY
Kenyon & Kenyon
ATTORNEYS

Nov. 15, 1966 C. BANCROFT 3,285,503

FLUID DISPLACEMENT DEVICE

Filed March 18, 1965 17 Sheets-Sheet 8

INVENTOR.
CHARLES BANCROFT
BY Kenyon & Kenyon
ATTORNEYS

INVENTOR.
CHARLES BANCROFT
BY
Kenyon & Kenyon
ATTORNEYS

Nov. 15, 1966 C. BANCROFT 3,285,503

FLUID DISPLACEMENT DEVICE

Filed March 18, 1965 17 Sheets-Sheet 10

INVENTOR.
CHARLES BANCROFT
BY
Kenyon & Kenyon
ATTORNEYS

Nov. 15, 1966 C. BANCROFT 3,285,503

FLUID DISPLACEMENT DEVICE

Filed March 18, 1965 17 Sheets-Sheet 11

INVENTOR.
CHARLES BANCROFT
BY
Kenyon & Kenyon
ATTORNEYS

Nov. 15, 1966 C. BANCROFT 3,285,503

FLUID DISPLACEMENT DEVICE

Filed March 18, 1965 17 Sheets-Sheet 12

INVENTOR.
CHARLES BANCROFT
BY
Kenyon & Kenyon
ATTORNEYS

INVENTOR.
CHARLES BANCROFT
BY
Kenyon & Kenyon
ATTORNEYS

FLUID DISPLACEMENT DEVICE

Filed March 18, 1965 17 Sheets-Sheet 14

INVENTOR.
CHARLES BANCROFT
BY
Kenyon & Kenyon
ATTORNEYS

Nov. 15, 1966 C. BANCROFT 3,285,503

FLUID DISPLACEMENT DEVICE

Filed March 18, 1965 17 Sheets-Sheet 15

INVENTOR.
CHARLES BANCROFT
BY
Kenyon & Kenyon
ATTORNEYS

Nov. 15, 1966 C. BANCROFT 3,285,503

FLUID DISPLACEMENT DEVICE

Filed March 18, 1965 17 Sheets-Sheet 16

INVENTOR.
CHARLES BANCROFT
BY
Kenyon & Kenyon
ATTORNEYS

Nov. 15, 1966 C. BANCROFT 3,285,503

FLUID DISPLACEMENT DEVICE

Filed March 18, 1965 17 Sheets-Sheet 17

INVENTOR
CHARLES BANCROFT
BY
Kenyon & Kenyon
ATTORNEYS

United States Patent Office 3,285,503 Patented Nov. 15, 1966

3,285,503
FLUID DISPLACEMENT DEVICE
Charles Bancroft, 178 Ferris Hill Road, New Canaan, Conn.
Filed Mar. 18, 1965, Ser. No. 444,913
49 Claims. (Cl. 230—187)

This application is a continuation-in-part application of U.S. application Serial No. 323,445, filed November 13, 1963, now abandoned.

This invention relates to a fluid displacement device in which one of a pair of opposed cylinders connected to one another and a pair of opposed pistons connection to one another are pivotally engaged to a crankshaft at a crankpin thereof which travels along a linear path as the crankshaft revolves, and more in particular, to a device in which at least a portion of the valving arrangement for the fluid is disposed within the crankpin.

In the prior art there are found devices which include opposed pistons connected to one another and engaged to a crankpin which reciprocates in a linear manner along the axis of the pistons. In such devices means have been provided to convert the reciprocating linear motion of the pistons and the crankpin to rotational motion. Examples of such prior art devices are found in my U.S. Patent No. 2,844,040, issued July 22, 1958. Due to the opposed stationary cylinder construction and the reciprocating linear motion of the crankpin of such devices, a certain degree of compactness has been achieved in them. However, the provision of various ports and passages about the cylinders and in communication therewith for conducting and controlling the flow of fluid into and out of the cylinders has increased both the overall size and the complexity of the prior art devices. Furthermore, such arrangements of ports and passages make it more difficult to obtain high volumetric efficiency in the device.

In certain other devices of the prior art having stationary opposed cylinders, the design of the device has been complicated by the fact that passages in the cylinder must cooperate with passages in the moving pistons in providing the movement of fluid with respect to the cylinders. Thus the fluid handling capabilities of such devices are complicated by the necessity of conducting the flow of fluid between openings in the walls of the cylinders and openings in the moving pistons. In addition to complicating the handling of the fluid flow, the arrangement of passages in the cylinder walls for connection to passages in the pistons can result in an increase of the overall size of the device.

In certain devices of the prior art, the provision of a plurality of cylinders has been accomplished by either adding additional pairs of cylinders disposed in a plane common with the original pair and at an angle thereto in the manner of a radial engine. On the other hand, additional pairs of cylinders have been added in a side-by-side or in-line arrangement. Either construction can complicate the valving of the cylinders and add to the overall size of the engine.

It is therefore one of the objecs of the invention to improve the volumetric efficiency of a fluid displacement device having pairs of opposed cylinders and pistons.

It is another object of the invention to improve the compactness of a fluid displacement device having pair of opposed cylinders and pistons.

It is still another object of the invention to improve the control of flow in and the volumetric efficiency of a fluid displacement device by providing at least a portion of the valving arrangement for the device within the crankpin of its crankshaft.

It is an additional object of the invention to provide a fluid displacement device in which pairs of opposed cylinders move with respect to a pair of stationary opposed pistons.

It is another additional object of the invention to improve the flow paths as well as the compactness of a fluid displacement device by providing a flow passage within the crankshaft.

It is a further object of the invention to combine a plurality of pairs of opposed cylindrical pistons in a fluid displacement device by arranging the pairs in a concentric manner.

It is another further object of the invention to provide a device having both driving and driven pairs of opposed cylinders and pistons arranged in a concentric manner with respect to one another.

It is also an object of the invention to utilize the interior portion of each of the pistons as a reservoir for receiving the charge prior to its delivery into the cylinders.

In addition it is an object of the invention to combine together pairs of cylinders, each of which has its longitudinal axis disposed substantially at right angles to that of the other.

In one embodiment of the invention the fluid displacement device includes a pair of opposed cylinders and a pair of opposed pistons, one of which pairs is pivotally engaged with the crankpin of a crankshaft. The crankpin is confined to reciprocate along a liner path within the device as the crankshaft revolves. Means are provided for coupling the revolving motion of the crankshaft to the rotation of an external shaft. Means are disposed within the crankshaft for controlling the movement of fluid with respect to the cylinders in response to the motion of the crankshaft. The provision within the crankshaft of the means for controlling the fluid eliminates the more complex and space-consuming arrangements of the prior art and at the same time enables the conducting of the flow and the control of it with respect to the cylinders to be more effectively made, thereby increasing the volumetric efficiency of the device.

In another embodiment of the invention the volumetric efficiency and control of the fluid flow is enhanced and the compactness of the engine improved by disposing at least a portion of the valving arrangement for the device within the crankpin of its crankshaft.

In a further embodiment of the invention the device includes a plurality of pairs of opposed cylinders and pistons which are disposed in a concentric arrangement with flow passing from one pair of cylinders to the other. The concentric construction consolidates the device and enables a single crankpin to contain the valving for the plurality of cylinders.

There is also an embodiment of the invention in which pairs of opposed driving cylinders and pistons and opposed driven cylinders and pistons are engaged with a common crankshaft which contains the valving arrangement for each of the pairs.

In addition there is an embodiment of the invention in which each of the pistons contains a reservoir for receiving at least a portion of a charge prior to its introduction into a cylinder.

Furthermore, there is an embodiment of the invention in which assemblies including pairs of cylinders disposed at right angles to one another are combined with their valving arrangement in communication with a common cavity within the crankshaft.

Specific examples of mechanism and machines embodying the principals of the invention are illustrated by the accompanying drawings in which.

Figure 14:
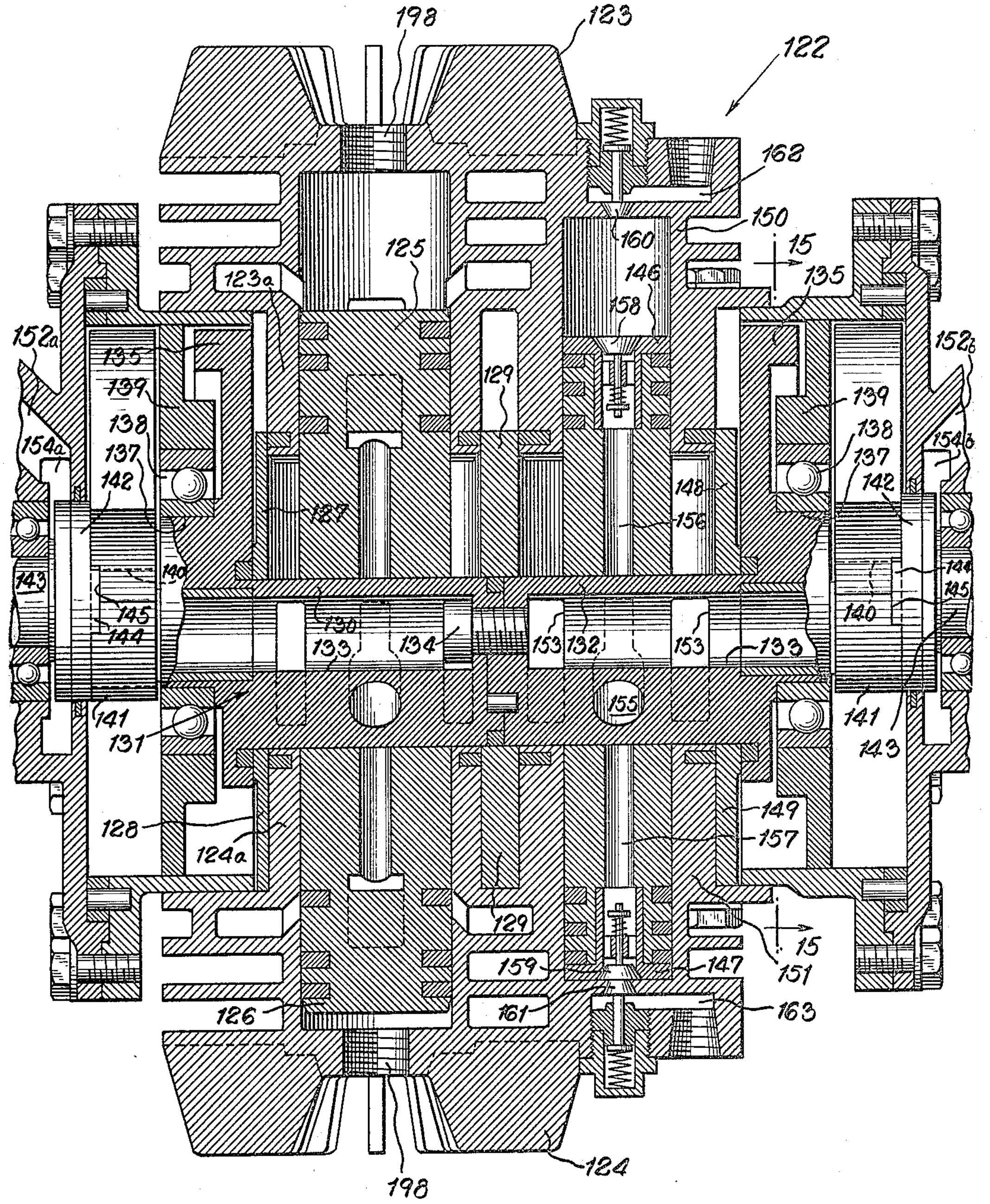
Figure 15:
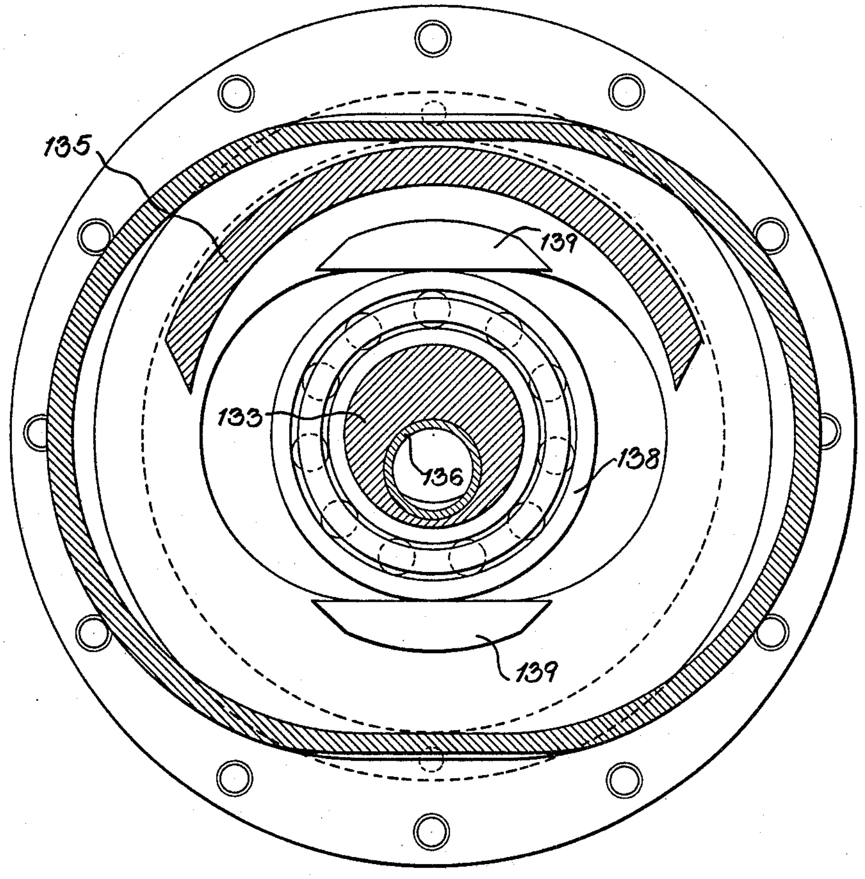

FIG. 14 is a vertical section view showing a device in which a pair of opposed driving and a pair of opposed driven pistons are connected to the crankpin or a common crankshaft; and FIG. 15 is a vertical section view taken along the line 15—15 in FIG. 14 and showing the bearing arrangements of the crankshaft which is adapted to move along a path at right angles to the path of travel of the driving and driven pistons of the device.

Figure 16:
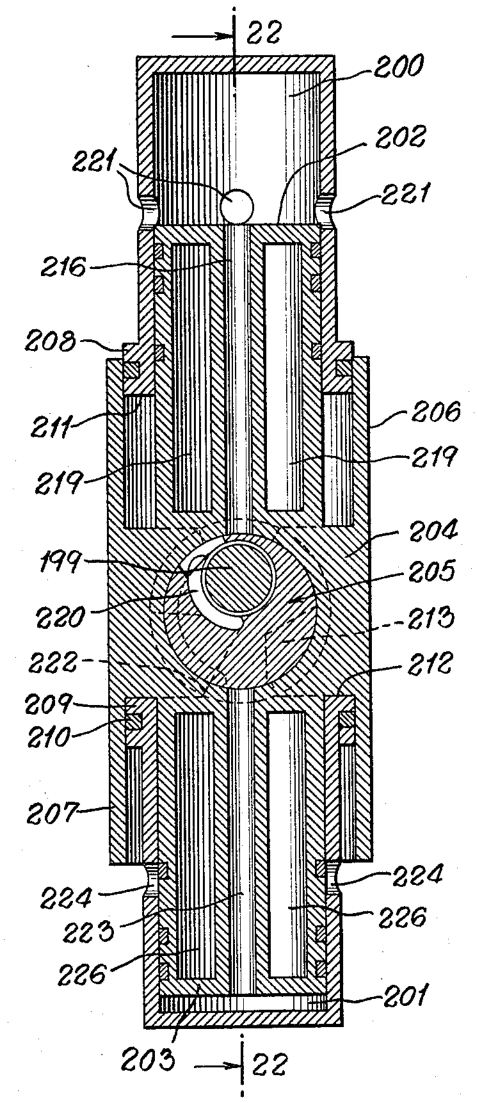

FIG. 16 is a fragmentary vertical section view showing the reservoir construction within the inner portion of each of the pistons.

FIGS. 17–21 are fragmentary vertical section views taken at right angles to the axis of rotation of the crankshaft and showing the pistons and the valving arrangement in different positions which occur during one cycle of operation of the engine.

Figure 22:
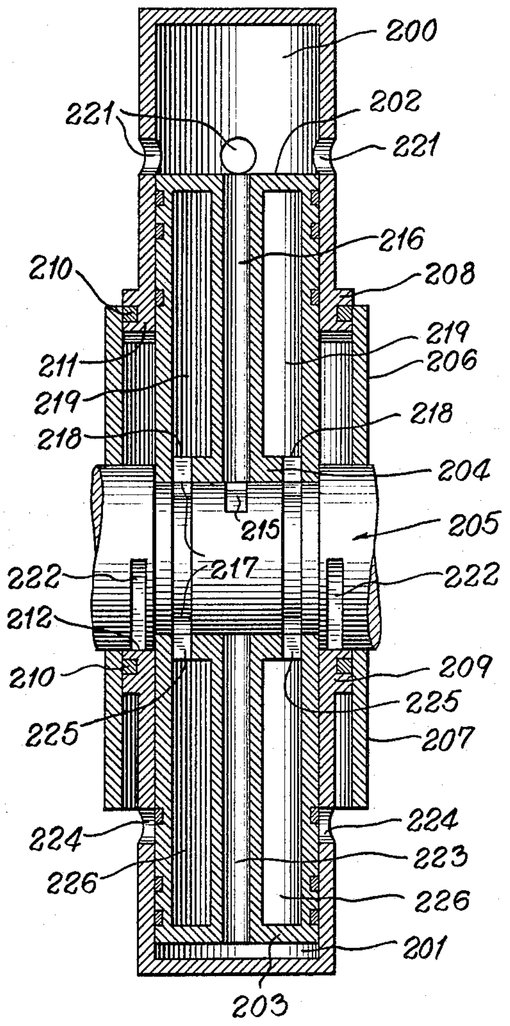

FIG. 22 is a vertical section view taken parallel to the axis of rotation.

FIGS. 23–26 are fragmentary vertical section views showing the different positions which occur during one cycle of the operation of an engine having two pairs of cylinders disposed at right angles to one another.

Figure 27:
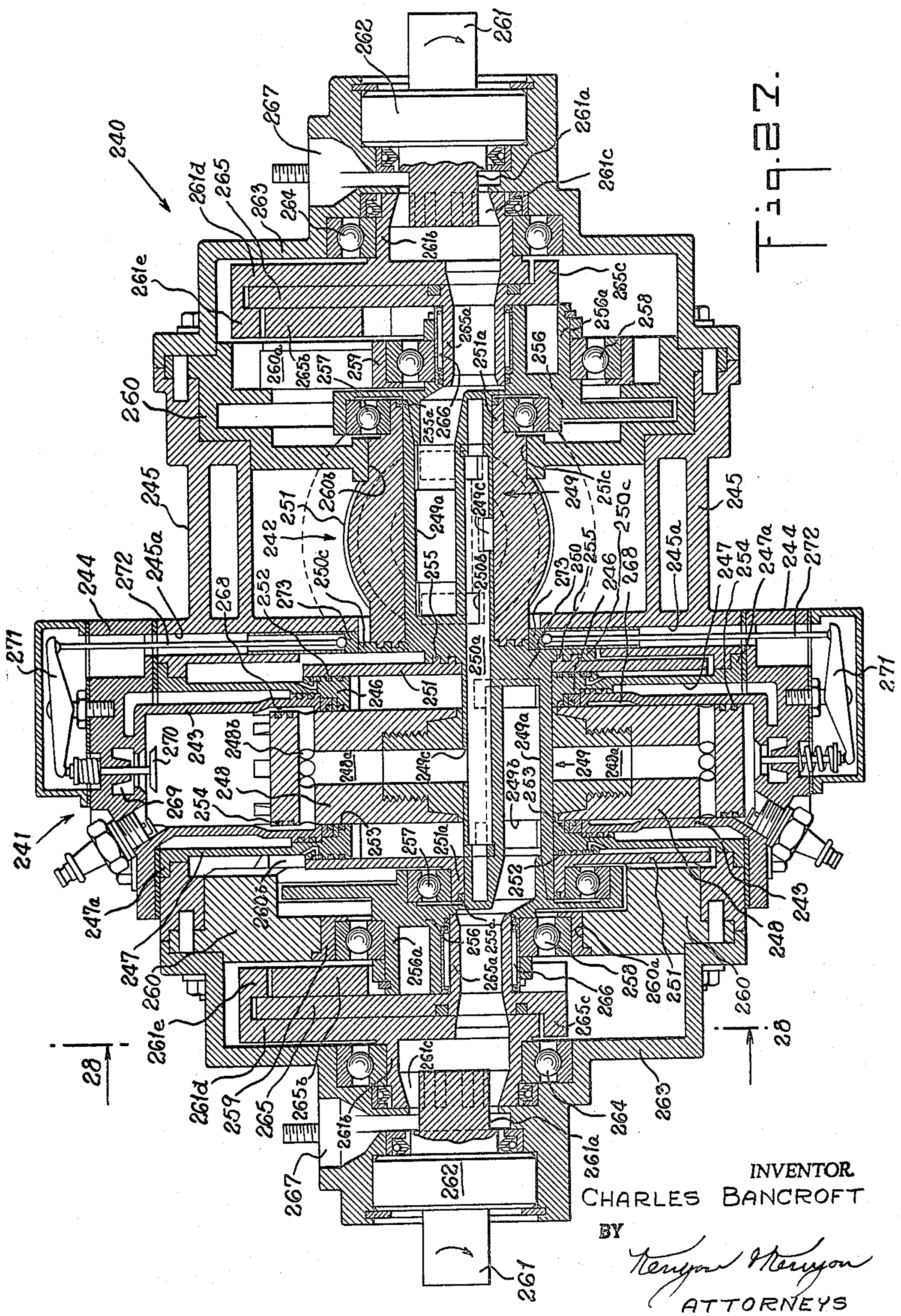

FIG. 27 is a vertical section view of another embodiment of the invention which includes two pairs of cylinder assemblies with each cylinder having an exhaust valve.

Figures 7, 8, 9, 10, 11, 12:
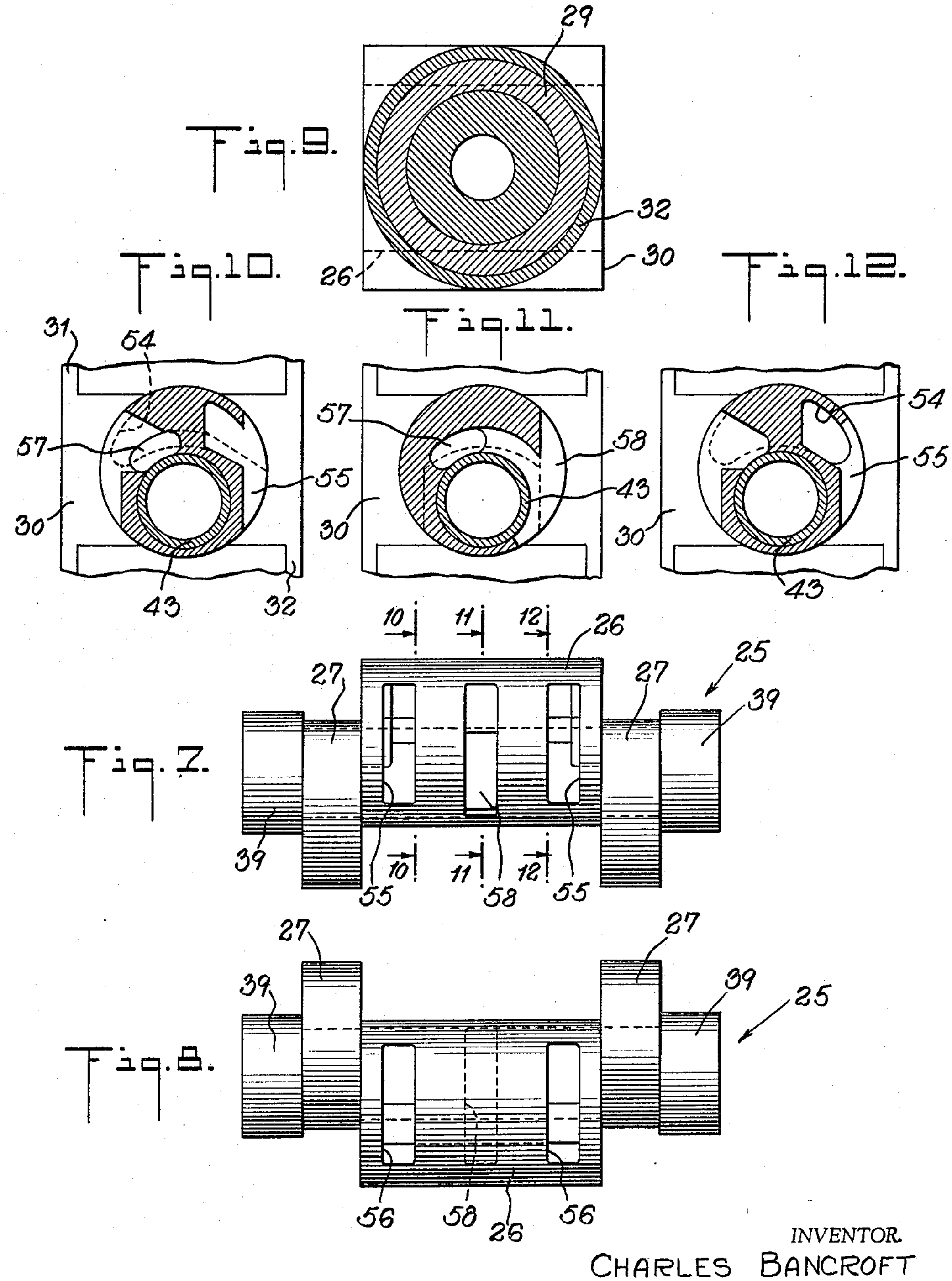
FIG. 7 is an elevational view of the crankpin, crankpins, and journals of the crankshaft.
FIG. 8 is an elevational view of the crankpin, crankpins and journals of the crankshaft in a position inverted with respect to that of FIG. 7.
FIG. 9 is a fragmentary horizontal section view taken along the line 9—9 in FIG. 3 and showing the crosshead to which the pistons and sleeves are attached.
FIG. 10 is a fragmentary vertical section view taken along the line 10—10 in FIG. 7 and showing a portion of the passages within the crankpin.
FIG. 11 is a fragmentary vertical section view taken along the line 11—11 in FIG. 7 and showing the central passage of the crankpin for delivering the fluid to the passages within the pistons.
FIG. 12 is a fragmentary vertical section view taken along the line 12—12 in FIG. 7 and showing a portion of the passages within the crankpin.
Figures 28, 29:
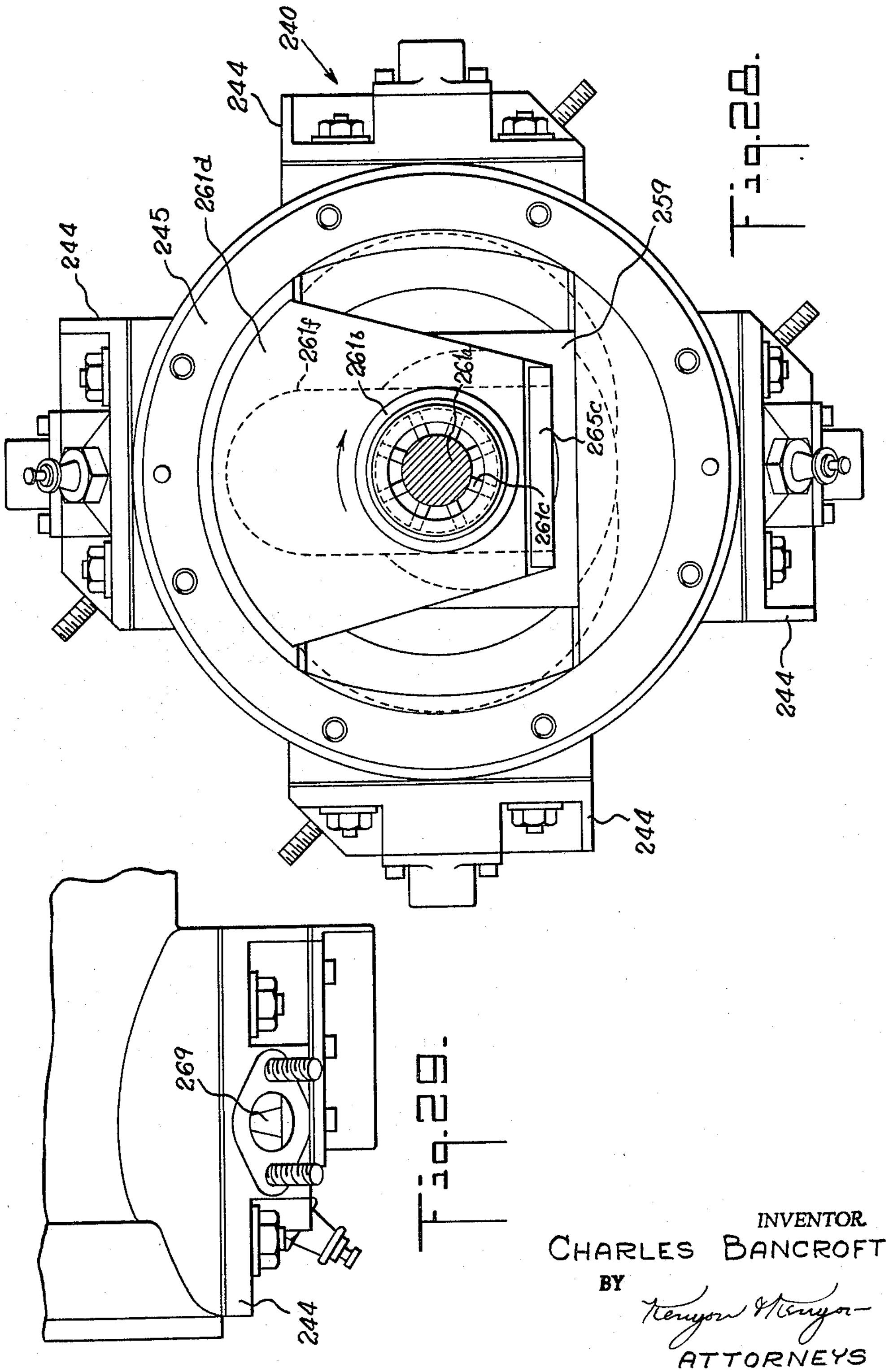

FIG. 28 is a vertical section view taken along the line 28—28 in FIG. 7 and showing the counterweight assembly for one of the output shafts and the intake passages into the output shaft.

FIG. 29 is a fragmentary side elevational view of one of the cylinder heads showing the exhaust port.

Figure 1:
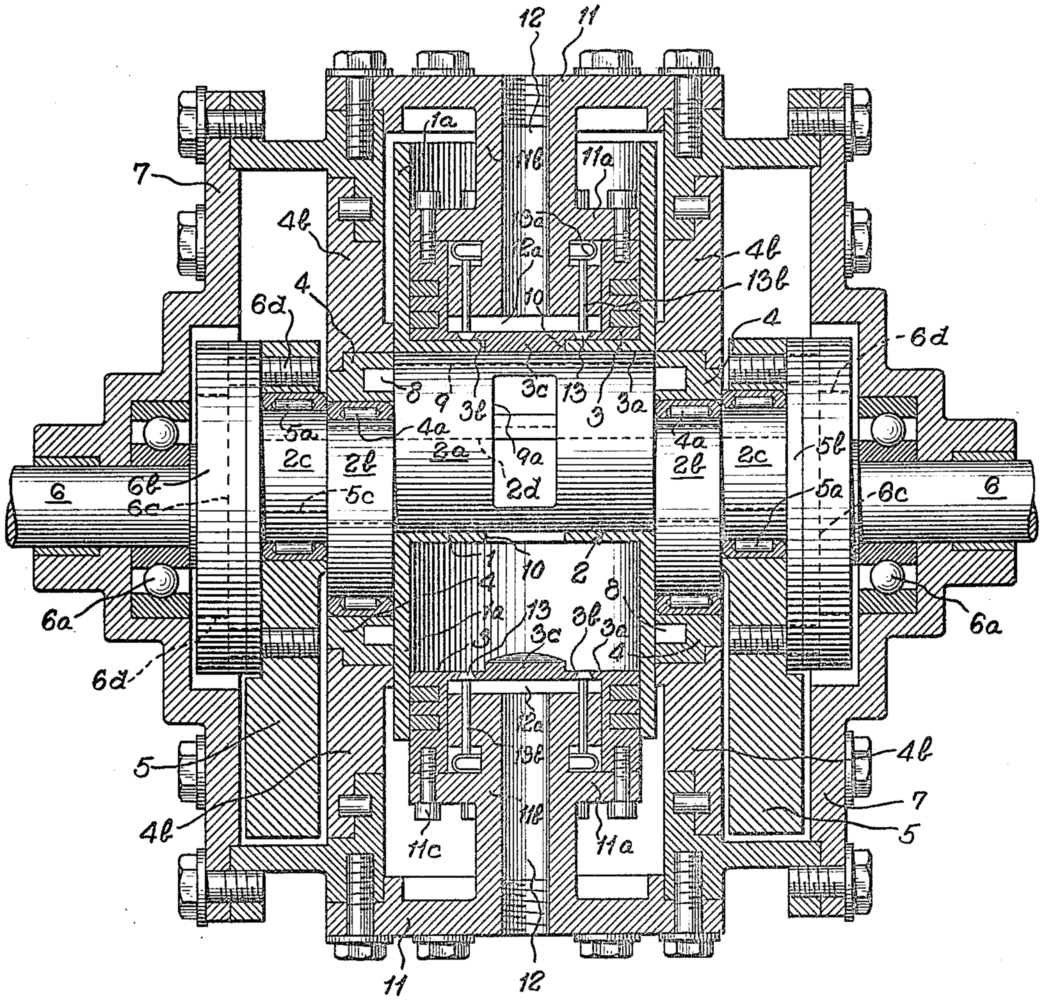
FIG. 1 is a vertical section view of a displacement device in which opposed cylinders connected to one another and engaged with the crankpin of a crankshaft are reciprocated in a linear manner with respect to a pair of opposed stationary pistons.

In the embodiment of the fluid displacement device of the invention shown in FIG. 1 there is provided a compressor or pump. The compressor or pump includes crosshead 1 pivotally engaged with crankpin **2*a* of crankshaft 2. Extending from crosshead 1 is a pair of opposed moving cylinders 1*a*, each of which engages a different one of the pair of opposed stationary pistons 3. By virtue of the crosshead construction with the cylinders extending therefrom and in view of their engagement with the stationary pistons, the cylinders and, in turn, crankpin 2*a*** are confined to reciprocate along a straight line which is parallel to the longitudinal axis of the stationary pistons.

Crankshaft 2 further includes additional crankpins **2*b* which are pivotally mounted with respect to slide blocks 4 by needle bearings 4*a*. As shown in FIG. 1, slide blocks 4 are mounted in slideways 4*b* which confine each of the slideblocks to movement along lines disposed at right angles to the plane of the drawing and therefore at right angles to the path of movement of the cylinders. In addition crankshaft 2 is provided with journals 2*c* which are pivotally engaged to counterweights 5 by means of needle bearings 5*a*. External shafts 6 supported by ball bearings 6*a* in crankcase 7 are connected to counterweights 5 by means of coupling 6*b* having key 6*c* engaged with keyway 5*b* in the counterweight. Cap screws 6*d* clamp the key and keyway assembly together. With this arrangement for the crankshaft and upon reciprocation of cylinders 1*a*, additional crankpins 2*b* reciprocate slideblocks 4 with respect to slideways 4*b*, and in response thereto, journals 2*c* are revolved about the axis extending through external shafts 6. Due to the connecting action of crankpins 2*c***, the external shafts rotate whenever the journals revolve.

The mounting of crankshaft 2 by means of the additional crankpins within the slideblocks and the engagement of the moving opposed cylinders with respect to the stationary opposed pistons serve to confine the moving cylinders to a linear reciprocating motion and to support the crankshaft without the need of separate crankshaft bearings which are fixed with respect to the crankcase. Thus the engagement of the cylinders with the pistons and the arrangement of the additional crankpins not only enable the reciprocating motion of the cylinders to be converted to rotary motion at the external shafts but serve the additional purpose of eliminating the need for separate crankshaft bearings. Consequently with the crankshaft so supported, there is no need to apply any portion of the crankshaft radial loads to the external casing. Therefore couplings **6*b* are adapted to transmit only the torque of the crankshaft, but not its radial loads, so that ball bearings 6*a*** need only support the radial loads of the external shafts.

The interior of crankshaft 2 contains passage **2*d* through which extends shaft 5*c*** which connects the counterweights to one another and maintains the counterweights in alignment in order that they properly counterbalance the shaking forces of the device during operation.

In the pump or compressor arrangement of the device shown in FIG. 1, passages 8 in the slide blocks serve to deliver the incoming flow of fluid which is to be pumped or compressed. Crankpin **2*a* contains passage 9 offset from and extending parallel to the central axis of the crankpin. In the position shown in FIG. 1, passage 9 has just been in communication with the upper pair of passages 8 so that flow can pass through passages 8 and enter into passage 9. Port 9*a* of the crankpin is in communication with passage 9** therein.

Each of cylinders **1*a* includes opening 10 which enables the incoming fluid to enter one of the cylinders at a time whenever opening 10 aligns with port 9*a* of the crankpin. Thus as shown in FIG. 1 where the lower one of cylinders 1*a* has approached its uppermost position, fluid has been passing into the lower cylinder as the volume therein increased with the upward movement of the lower cylinder. At the end of the upward movement of the lower cylinder, port 9*a* advances beyond a position in which it is aligned with opening 10** so that the inlet flow passage to the lower cylinder is interrupted. During the time one of the cylinders, for example the lower cylinder, is receiving a flow of fluid, the opposite cylinder, for example, the upper cylinder, is compressing or pumping the fluid which has been previously received.

Each of stationary pistons 3 are attached to flange **11*a* extending from support 11*b* which in turn extends inwardly from end plate 11 attached to crankcase 7. Cap screws 11*c* retain the pistons in position upon the flange. Extending through supports 11*b* are discharge passages 12 which at one end are in communication with openings adjacent to the flanges. The opposite end of passages 12 intersect transverse discharge passages 12*a* adjacent to head 3**a of the stationary pistons.

Poppet valves 13 which engage seats **3*b* within the head of each of the pistons are biased into a normally closed position by valve springs 13*a* which can be of a cantilever-type. Stems 13*b* of the valves are piloted within openings in support 11*b*. Valves 13 are conditioned to open in response to a predetermined pressure within the cylinder adjacent thereto by the selection of the spring constant for valve springs 13*a***.

As shown in FIG. 1 as the upper cylinder approaches its uppermost position with respect to the upper one of the stationary pistons, the fluid within the cylinder is compressed and when the predetermined pressure level is reached, poppet valves 13 open and release the pressurized fluid into transverse passage **12*a* and from there into discharge passage 12**.

The volumetric efficiency of the device can be increased by the provision of boss **3*c* on the head of each of the pistons. The bosses are aligned with opening 10 so that whenever one of the cylinders is at the end of its travel and adjacent the piston, the boss can enter opening 10. In this manner there is no unswept area within the cylinder prior to the beginning of an intake stroke. As shown in FIG. 1, boss 3*c* has a curved upper surface which corresponds to the radius of curvature of crankpin 2*a* so that no interference takes place when the boss enters opening 10**.

The construction of the device of FIG. 1 such as that of crankshaft 2 as well as its support by the additional crankpins the slide blocks can be further understood from the related portion of the description and drawings for the other embodiments of the invention. Thus, for example, crankshaft 2 is related to that shown in FIG. 4 while the crankpin, the additional crankpins, and passage 9 are related to those shown in FIG. 5 and 6.

Engine 20 (FIG. 2) includes casing 21 containing chamber 22. Upon end flanges **21*a* and 21*b* of the casing there are mounted cylinder heads 23 and 24, respectively, in an opposed relationship. Cylinder heads 23 and 24 contain opposed cylinders 23*a* and 24*a*, respectively, which are disposed in part within chamber 22 of the casing. The inner end portions of cylinders 23*a* and 24*a* form stationary or outer annular pistons 23*d* and 24*d*, respectively. Cylinder heads 23 and 24 are furnished with cooling fins 23*b* and 24*b*, respectively, in order to promote heat transfer from the engine to the surrounding atmosphere. Similarly, chamber 22 is provided with cooling fins 22*a***.

Figure 3:
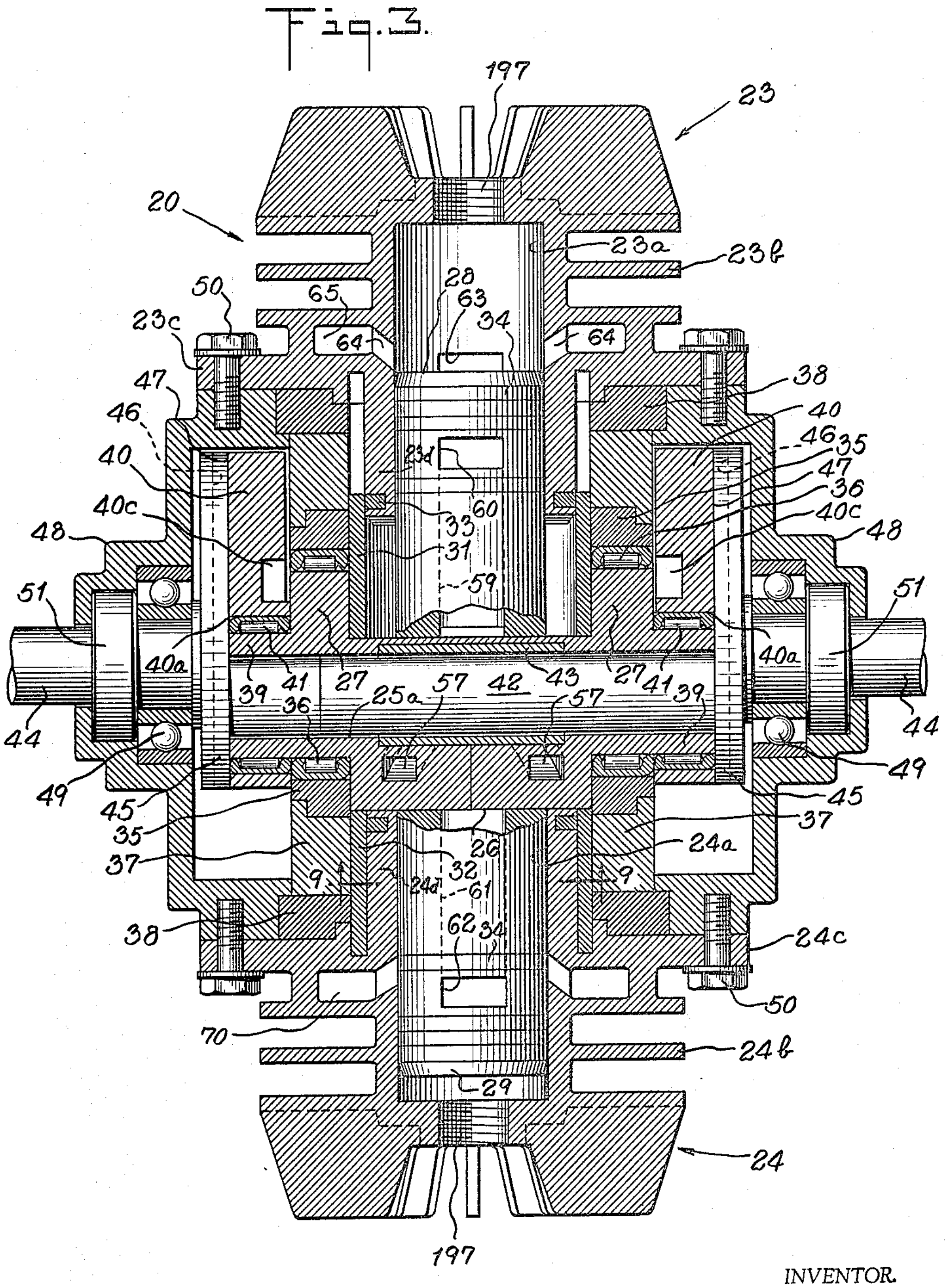
FIG. 3 is a vertical section view taken along the line 3—3 in FIG. 2 and showing the mechanism for converting the reciprocating motion of the pistons into rotary motion of the output shaft.
Figure 5:
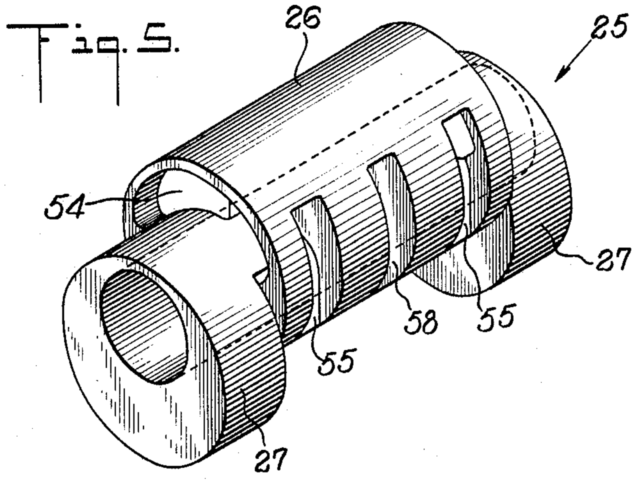
FIG. 5 is a fragmentary perspective view of the crankshaft showing the crankpin with the openings and slots therein for controlling the movement of fluid with respect to the cylinders.
Figure 6:
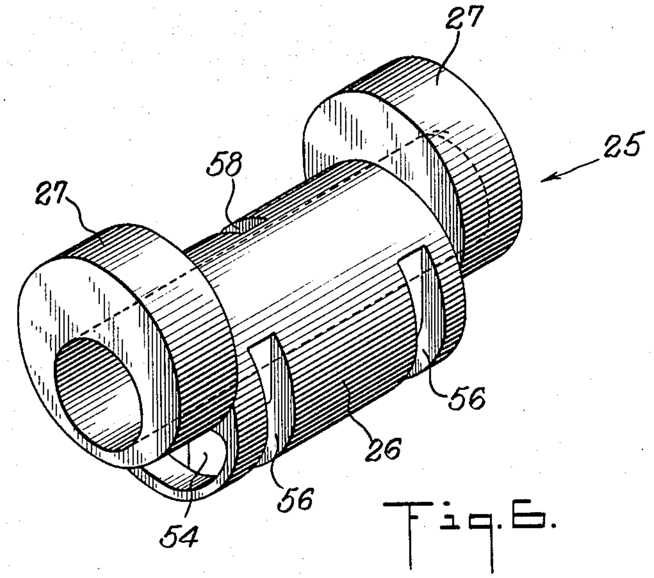
FIG. 6 is an additional fragmentary perspective view of the crankshaft showing additional slots within the crankpin.

Crankshaft 25 of the engine which is shown in part in FIG. 5 and 6 and completely in FIGS. 3, 7 and 8 includes crankpin 26 and additional crankpins 27. Opposing moving pistons 28 and 29 which are disposed in cylinders **23*a* and 24*a*, respectively, adjacent to stationary pistons 23*d* and 24*d*, respectively, extend from crosshead or cylinder head 30 or additional or outer moving cylinders 31 and 32. Crosshead 30 contains bore 30*a* pivotally mounted upon crankpin 26 of the crankshaft. Cylinders 31 and 32 extend from cylinder heads or cross head 30 in opposite directions and surround a portion of the length of pistons 28 and 29, respectively (FIGS. 5 and 9). The pistons and cylinders restrict the crosshead to a linear path of motion parallel to the central axis of cylinder 23*a* and 24*a* by their engagement with the inner and outer surfaces of the stationary pistons 23*d* and 24*d*. Rings 33 seal the stationary pistons 23*d* and 24*d* with respect to cylinders 31 and 32 while rings 34 seal moving pistons 28 and 29 with respect to 23*a* and 24*a***.

The means for converting the reciprocating linear motion of pistons 28 and 29 and cylinders 31 and 32 to a rotational output motion includes additional crankpins 27 (FIGS. 3 and 4) of crankshaft 25 which are pivotally engaged to slideblocks 35 by means of needle bearings 36. The needle bearings are disposed in bearing retainers mounted in the slideblocks 35. Slideblocks 35 are restricted to linear movement along axes which extend at right angles to the axis of the linear movement of the pistons. Slideways 37 which are supported in sections 38 of the crankcase, engage the slideblocks 35 and confine them to the linear motion described. Crankshaft 25 further includes journals 39 which in conjunction with crankpins 27 serve as the means for revolving the counterweights 40 about the axis of rotation of the output shaft of the engine. Journals 39 are pivotally connected to counterweights 40 by means of needle bearings 41 mounted within bores **40*a* of the counterweights. Output or external shafts 44 are connected to one another by means of shaft 42 extending through bore 25*a* of the crankshaft and with clearance between it and bushing 43. The inertia forces of cylinders 31 and 32, pistons 28 and 29**, and the slideblocks are substantially balanced by the counterweights.

With this arrangement it can be seen that crosshead 30 with cylinders 31 and 32 and pistons 28 and 29 reciprocate along a path which is perpendicular to the path of movement of crankpins 27 and slideblocks 35. The result of this construction is that journals 39 of the crankshaft are caused to revolve in a circular path about a common axis which is coextensive with the axes of output shafts 44. Each of couplings 45 attached to different ones of the output shafts contain key 46 engaged with groove 47 in counterweight 40 and thereby serve as the means for coupling the revolving motion of the journal and counterweight to the rotating motion of the output shaft. Shafts 44 are supported with respect to end covers 48 by ball bearings 49. Cap screws 50 secure the end covers to flanges **23*c* and 34*c* of the cylinder heads. Oil seals 51 are located within the end covers adjacent to shafts 44**.

The assembly including the pairs of engaged cylinders and pistons, the crosshead, and the additional crankpins within the slideblocks serve to provide a strong and yet compact supporting structure for the crankshaft with a reduced number of bearing surfaces and an increased bearing surface area. Supporting the crankshaft in this manner eliminates the need for separate crankshaft bearings, serves to distribute the pressure and inertia loads, and results in a compact device having great inherent strength capable of withstanding increased operating pressures. Furthermore, this construction prevents binding if the axis of each of the output shafts does not coincide with the axis of the circular path of the crankshaft.

Figure 4:
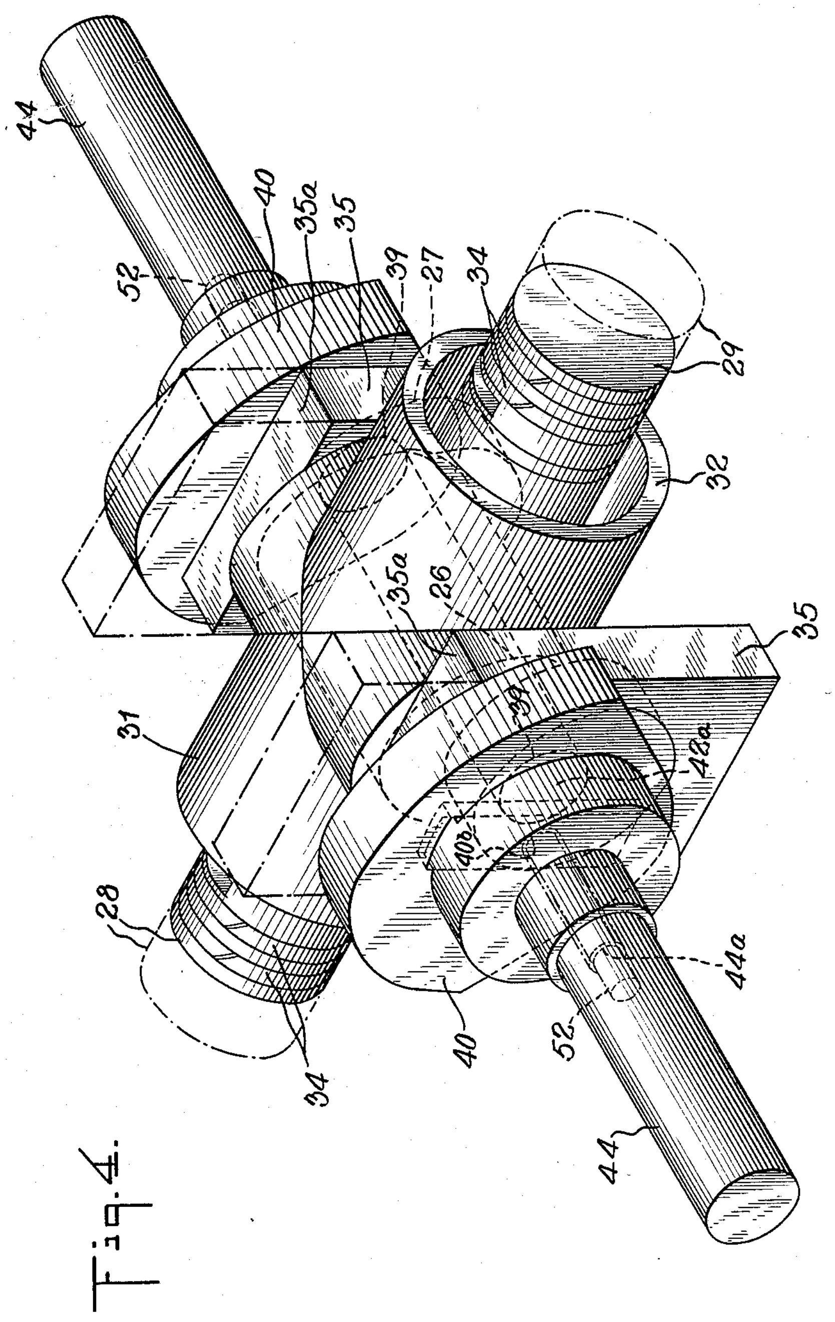
FIG. 4 is a perspective view of the mechanism for converting the reciprocating motion of the pistons into the rotary motion of the output shaft.

The provision of couplings 45 with the key and slot arrangement for connecting the output shafts to the counterweights introduces a degree of flexibility at these points of connection which can accommodate the necessary tolerances of manufacture which could otherwise result in misalignment between the axis about which journals 39 revolve and the axis of output shafts 44. Of course where tolerances are held sufficiently close for all elements of the device, the output shafts can be rigidly connected to the counterweights. As shown in FIG. 4 where coupling 45 is employed, more precise alignment between the counterweights and the output shafts can be established by providing quill shafts 52 engaged with bore **40*b* within each of the counterweights and bore 44*a* within each of the output shafts. FIG. 4 also shows a variation in construction from that of FIGS. 2 and 3 in that shaft 42*a*, extending through bore 25*a*** of the crankshaft, connects the counterweights instead of the output shafts.

Figure 2:
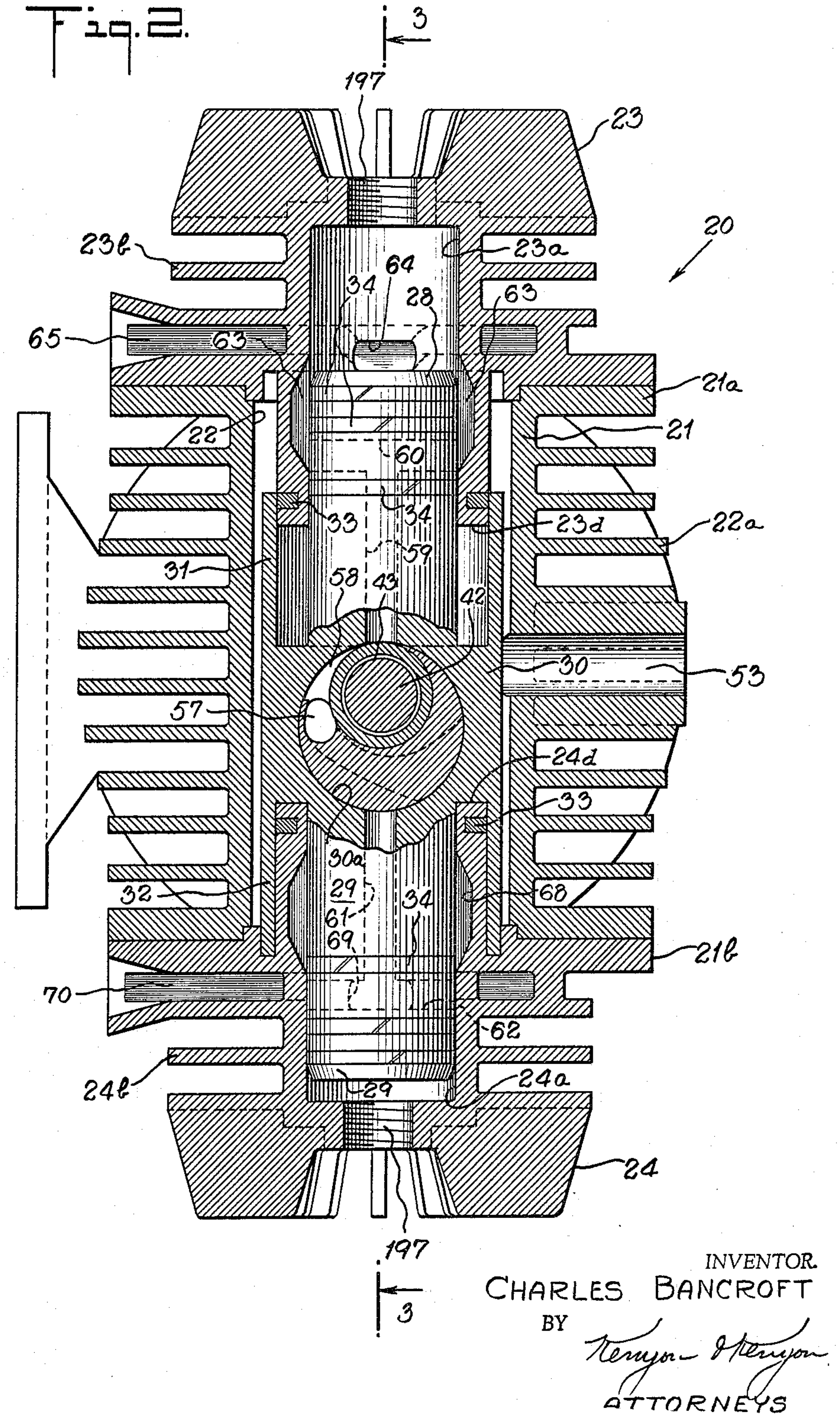
FIG. 2 is a vertical section view showing an engine having opposed pistons engaged with the crankpin of a crankshaft and having a valving arrangement within the crankpin in accordance with the present invention.

A flow of a combustible gas mixture is introduced into the engine by means of intake port 53 (FIG. 2). The combustible gas mixture can include a mixture of air and fuel produced by a device connected to intake port 53, such as a carburetor. Beyond the intake port, the gas mixture enters into the crankcase cavity formed between the inner surface of chamber 22 and both the outer surface of cylinders 31 and 32 and the outer portion of crosshead 30 from which cylinders 31 and 32 extend. The mixture then flows around end portion 35*a* of the slideblocks (FIG. 4), through recesses 40*c* in counterweights 40 (FIG. 3), and into opening 54 in crankpin 26 (FIGS. 5 and 6).

Within crankpin 26 there is disposed at least a portion of the valving arrangement of the device including passages or slots 55 which are in communication with inlet openings 54. Slots 55 are adapted to serve as the means for conducting the mixture to the cavities formed in cylinders 31 and 32 and extending around pistons 28 and 29, respectively. For example, the cavity in the cylinder moving inwardly from its stationary piston can draw in a new charge.

Thus as shown by the position of the crankpin in FIGS. 2, 6, 8, the delivering of the mixture to cylinder 31 surrounding piston 28 by means of slots 55 has taken place since piston 29 is shown as just completing its compression stroke. On the other hand, in the position of crankpin 26, as shown in FIGS. 5, 7, and 10–12, slot 55 has just completed delivering the mixture to the cavity surrounding piston 29. Thus, it can be seen that whenever one of the additional cylinders 31 and 32 move inwardly, that is to say away from the one of stationary pistons 23*d* and 24*d* adjacent thereto, a charge is drawn into that cylinder.

On the other hand, whenever one of cylinders 31 and 32 moves outwardly, that is toward the one of stationary pistons 23*d* and 24*d* adjacent thereto, the mixture in the cylinder is compressed. Slots 56 in crankpin 26, whenever they come into a position in communication with the cavity between a given one of cylinders 31 and 32 and one of the stationary pistons adjacent thereto, serve as the means for delivering the compressed mixture through passages 57 which connect to central slot 58. From slot 58 the flow of compressed gas can enter either passages 59 and 60 of piston 28 or passages 61 and 62 of piston 29 depending on the position of slot 58. Thus it can be seen that the crankpin operates as a rotary valve for controlling the flow of fluid with respect to the cylinders.

As shown in FIG. 2, central slot 58 has just moved in a counterclockwise direction beyond passage 59 in piston 28. When slot 58 was previously aligned with passage 59, the flow of compressed gas could travel through passage 59 and passage 60 into recess 63 in the cylinder. From the recess, the compressed gas enters the portion of the cylinder above the piston and in the manner of a loop-scavenged engine, the compressed gas drives the exhaust products through exhaust port 64 and into exhaust outlet 65.

On the other hand, in the position of crankpin 26 shown in FIGS. 7 and 10–12, slot 58 has just passed beyond passage 61 which intersects passage 62 within piston 29. When piston 29 is at the bottom of its stroke, the compressed gas issuing from passage 62 is directed by recess 68 into the portion of the cylinder beyond the piston. Here again, the compressed gas sweeps the exhaust products out through exhaust port 69 and into exhaust outlet 70.

With this arrangement, the crankpin serves not only as an element for transmitting the linear motion of the pistons for ultimate conversion into rotary motion at the output shaft and not only as an element for providing the necessary valving arrangement and valve timing for the control of the flow of the combustible mixture into the cylinders, but also as a means for enabling the incoming flow of the combustible mixture to cool the central interior portion of the engine, such as the crosshead and the portions of cylinders 31 and 32 adjacent thereto. The rotary valve provided by the passages and slots within the crankpin eliminates the need of complex valve train mechanisms which normally require adjustments and which are subject to wear and uncertainty of operation, especially at high speeds. In addition, the valving arrangement greatly contributes to the compactness of the engine since it is mounted between the cylinders within the central portion of the engine as compared to the conventional valve systems which are mounted externally of the cylinder head. The sliding motions of the rotary valve and its integral relationship with the crankshaft enable the valve to operate with a minimum of friction, substantially no leakage, and a very precise degree of valve timing control.

Figure 13:
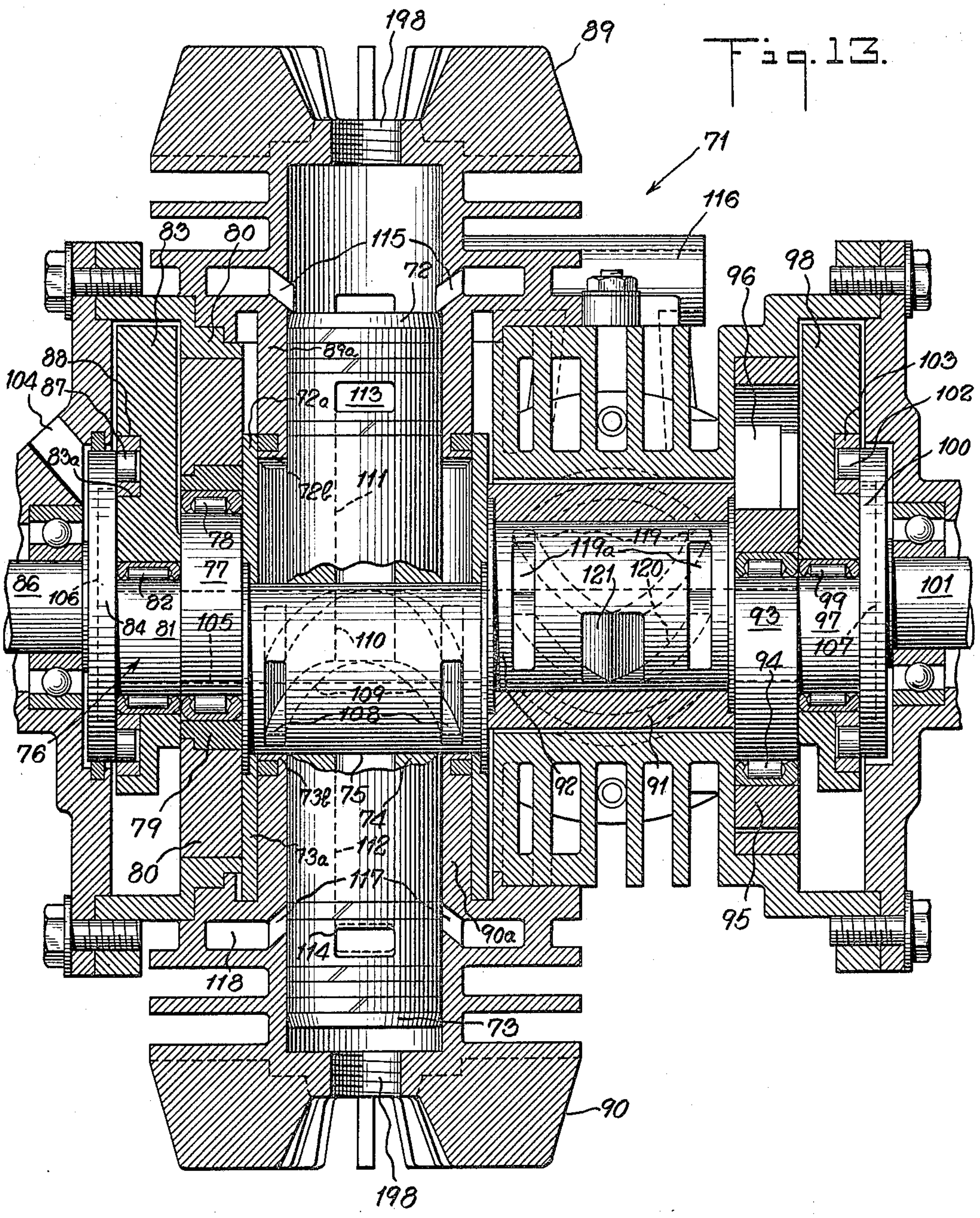
FIG. 13 is a vertical section view showing a pair of opposed pistons mounted at right angles to one another and connected to the crankpins of the crankshaft in accordance with the invention.

Engine 71 (FIG. 13) is a four-cylinder arrangement related to the two-cylinder arrangement of engine 20. Thus similarly to engine 20, engine 71 includes moving inner pistons 72 and 73 and moving outer cylinders 72*a* and 73*a* extending from common cylinder head or crosshead 74. Crosshead 74 is pivotally mounted on crankpin 75 of crankshaft 76 (FIG. 13). Crankshaft 76 includes additional crankpin 77 pivotally mounted by needle bearing 78 within sliding block 79. The sliding block is confined to linear motion along an axis disposed at right angles to the line of motion of pistons 72 and 73 and cylinders 72*a* and 73*a* by slideway 80. Journal 81 of crankshaft 76 is pivotally mounted by needle bearing 82 with respect to counterweight 83. Coupling 84 attached to output shaft 86 is connected to counterweight 83 by a plurality of pins 87 having grommets 88 disposed in recesses 83*a* of the counterweight. The use of grommets 88 formed from a resilient material, such as rubber, provides a degree of flexibility between the output shaft and the coupling to the crankshaft which can accommodate any minor degree of misalignment of the parts.

Engine 71 is further provided with cylinder head assemblies 89 and 90 which receive pistons 72 and 73, having outer stationary cylinders 89*a* and 90*a*, respectively. The inner end portions of the cylinders serve as stationary pistons 72*b* and 73*b* within moving cylinders 72*a* and 73*a*, respectively.

The second pair of cylinders and pistons for engine 71 are disposed at right angles to the line of travel of pistons 72 and 73. In a manner similar to that of the pistons and cylinders adjacent crankpin 75, the pistons and cylinders of the remaining pair extend from crosshead 91 which is mounted on crankpin 92 of crankshaft 76. The right hand portion of crankshaft 76 as seen in FIG. 13 is similar to the left hand portion thereof and is supported in a similar fashion. Thus crankpin 93 is pivotally mounted by needle bearings 94 within slideblock 95. Slideways 96 confine slideblock 95 to a path of movement parallel to the line of travel of pistons 72 and 73 and consequently at right angles to the pair of pistons extending from crosshead 91. Journal 97 of crankshaft 76 is pivotally supported with respect to counterweights 98 by needle bearing 99. Coupling 100 secured to output shaft 101 is provided with pins 102 which by way of grommets 103 engage counterweight 98. Thus engine 71 provides two pairs of cylinders disposed at right angles and directly adjacent one another and having pairs of opposed pistons which engage a short two-throw crankshaft. This construction results in an extremely compact four-cylinder engine.

Engine 71 contains intake port 104 for receiving the combustible fuel-air mixture. Crankshaft 76 contains internal passage 105 extending through its length and in communication with passages 106 and 107 in couplings 84 and 100, respectively. With this arrangement, flow can pass through intake port 104 and travel adjacent to the couplings into passage 105 which extends through crankpins 75 and 92.

Within each of the crankpins there is provided an arrangement of slots and passages which result in a rotary valve similar to that in crankpin 26 of engine 20. Thus, in FIG. 13 there is shown slots 108 and passages 109 in crankpin 75. The slots and passages cyclically conduct the fuel-air mixture, which has been partially compressed within the cavity between one of stationary pistons 72*b* and 73*b* and moving cylinders 72*a* and 72*b* extending from crosshead 91, to opening 110 in the crankpin. Pistons 72 and 73 are provided with passages 111 and 112, respectively, which lead to ports 113 and 114, respectively. Cylinder head 89 contains exhaust port 115 which connects to exhaust outlet passage 116. In a similar manner, cylinder head 90 contains exhaust port 117 which is connected to exhaust outlet passage 118.

Crankpin 92 includes slots 119 and passages 120 which cyclically communicate with opening 121 therein for delivering the mixture to the moving pistons disposed within the moving cylinders extending from crosshead 91. Slots 119*a* provide passage for the incoming charge into moving cylinders from passage 105 through crankshaft 76.

Engine 71 by virtue of the adjacent pairs of cylinders mounted in a mutually perpendicular relationship results in an extremely compact four-cylinder engine. Crankshaft 76 due to the provision of the adjacent crankpins disposed at 180 degrees with respect to one another is an inherently stiff and strong member which is supported in rotation by the engaged pistons and cylinders as well as by the crossheads. Thus again no separate crankshaft bearings are required. The hollow crankshaft serves as a manifold for delivering the combustible mixture to each of the pairs of cylinders and at the same time enables the incoming mixture to transfer heat from the central portion of the engine.

In FIG. 14 there is shown combined engine and compressor 122. The engine includes cylinder heads 123 and 124 from which extend stationary cylinders 123*a* and 124*a*, respectively, containing moving driving pistons 125 and 126, respectively. Piston 125 and moving cylinder 127 as well as piston 126 and moving cylinder 128 extend from crosshead 129 which is pivotally engaged about crankpin 130 of crankshaft 131. Crankshaft 131 which further includes crankpin 132 for the compressor portion of the assembly has hollow interior passage 133 extending throughout its length. The crankshaft when fabricated in two sections for ease of assembly is secured together by cap screw 134 which separates the passage into two portions. Counterweights 135 are attached to each of the opposite ends of the crankshaft to balance the crankshaft assembly upon its own axis. Crankshaft 131 also includes crankpins 137 upon which are mounted ball bearings 138. In turn, as shown in FIG. 15, bearings 138 are confined within guideways 139. By being confined within the guideways, each of bearings 138 are restricted to linear paths of motion extending at right angles to the path of motion of pistons 125 and 126. Crankshaft 131 is supported by the two sets of cylinders and pistons engaged therewith and by the ball bearings 138 which are confined to linear paths at right angles to each other, as explained above. Counterweights 141 are rotatably mounted on journals 140 extending from each end of crankshaft 131. Couplings 142 extending from counterweights 141 are attached to output shafts 143 by keys (not shown in FIG. 14) and contain other keys 144 at right angles to those connecting them to the output shaft which mate with grooves 145 in counterweights 141 and thereby transmit the motion of the counterweights to the output shafts. Passages 154*a* in communication with interior passage 133 connect intake ports 152*a* provided in the casing with interior passages 153. In this way, the revolving motion of the counterweight is coupled to the output shafts without the output shafts sharing in the support of the crankshaft.

The portion of crosshead 129 extending about crankpin 132 is provided with driven moving compressor cylinders 148 and 149 and pumping pistons 146 and 147. The inner end portions of stationary cylinders 150 and 151 form stationary pistons which are engaged with moving cylinders 148 and 149. The path of flow of the combustible fuel-air mixture into the engine is through intake port 152, past coupling 142, and into passage 133 within crankshaft 131. The rotary valving arrangement within crankpin 130 and the passages through pistons 125 and 126 are similar to those discussed above with respect to engine 20. Furthermore, cylinder heads 123 and 124 are provided with exhaust ports and passages similar to those of engine 20. Cap screw 134 within the crankshaft prevents the fuel-air mixture from passing into the portion of passage 133 adjacent to the compressor pistons.

The flow of fluid or gas into the compressor or pump enters by way of intake port 152*b* which is connected to annular cavity 154*b*. From the cavity, the gas passes into the portion of passage 133 of the crankshaft extending to the right of cap screw 134 as shown in FIG. 14. The rotary valving arrangement for the compressor disposed within crankpin 132 is similar to that for the engine within the crankpin 130. Thus, gas passes through passage 133, opening 153, and cylically into a different one of cylinders 148 and 149 surrounding one of moving pistons 146 and 147, respectively, and then is subsequently forced into a passage provided in the opposite moving piston. Thus, the partially compressed gas is cyclically directed from opening 155 in the crankpin to either one of passages 156 and 157 within pistons 146 and 147, respectively.

Pistons 146 and 147 are provided with spring biased poppet valves 158 and 159, respectively, which deliver the gas to their respective cylinders. Cylinders 150 and 151 contain spring biased poppet valves 160 and 161 which release the compressed gas to their respective outlet passages 162 and 163. The operating pressure point of each of the various poppet valves is predetermined by selection of the spring constant of the spring related thereto. A portion of all of these spring biased valves may be replaced with ports or the like without loss of the pumping action, but with some loss of efficiency or ability to work with high discharge pressures.

Combined engine and compressor 122 includes a greatly reduced number of parts as compared to that of a conventional engine driven compressor. This results from the use of a single crankshaft which serves for both the engine and the compressor. The common crankshaft further enables the overall device to be reduced in size. The rotary valving within the common crankshaft further contributes to the reduced number of parts of the device and because the rotary valving contains large passages and can be precisely timed, the compressor is capable of a much higher volumetric efficiency. Furthermore the concentric arrangement of moving and stationary pistons and cylinders provide an extremely compact two-stage compressor which has high volumetric efficiency due to the short passages and quick-acting function of the valving arrangement in the crankpin.

In each of the embodiments of the engine, in accordance with the invention, ignition can be provided by a spark plug inserted in spark plug hole 197 in engine 20 (FIGS. 2 and 3) and spark plug hole 198 in engine 71 (FIGS. 13 and 14). In addition the engines can operate with a compression-ignition cycle, especially since the crankshaft and crankpin arrangement provides the strength to withstand the high operating pressures accompanying a compression-ignition cycle. Where the engines are operated with compression-ignition, the fuel is injected into the cylinders rather than being mixed with the air. Dual injection can also be used with the spark-ignition arrangement.

It should be understood that the engine embodiments are not limited precisely to the form shown. The piston heads may be specially shaped to promote clean scavenging and to reduce loss of fresh charge or the exhaust ports in the cylinder walls timed by the pistons may be replaced by positively actuated exhaust valves installed in the cylinder heads such as are well known to the art.

In the operation of an engine in accordance with the invention, such as engine 20 of FIG. 2, the interaction of stationary or outer annular pistons **23*d* and 24*d* with respect to moving cylinders 31 and 32 causes the incoming charge to be pumped through the valving arrangement within crankpin 26 and into cylinders 23*a* and 24*a*. The displacement of the stationary pistons with respect to the moving cylinders can be selected to at least correspond to the displacement of moving pistons 28 and 29 so that the engine is operated with a normal charge in the cylinders. Thus, for example, the charge within moving cylinder 31 is pumped by stationary piston 23*d* and urged through the passages in crankpin 26 into cylinder 24*a***. To avoid excessive flow losses and pressure increases within the moving cylinders, it is necessary that the passages within the crankpin be conditioned to readily transmit the charging flow.

Since the pumping action in the stationary pistons and moving cylinders is a continuous one and since the admitting of a charge to either one of cylinders **23*a* or 24*a*** is necessarily an intermittent process, it can be understood that the passages within the crankpin serve to momentarily store or receive the charges from the moving cylinders and thereby act as a reservoir.

From the standpoint of maintaining the engine compact and to reduce the area of surfaces to be lubricated, it is desirable to provide the crankshaft, including the crankpin, with the minimum size which can safely carry the load. However, in providing a crankpin of minimum size, it is possible to achieve a design in which there is insufficient space for passages of sufficient size within the crankpin. As a result, a condition can be reached in which the ability of the crankpin passages to conduct the charge and to serve as a reservoir for the charge can be reduced to a point where the passages interfere with the flow and can only act as a reservoir when substantial compression of the charge occurs. Compression of the charge can be irreversible consumption of available energy since the compressed charge is expanded into the stationary cylinders when the piston is at the bottom of the stroke and the exhaust port is open. Thus the work done in compressing the charge would not be recovered and would represent a loss in overall efficiency of the engine. Thus the lack of adequately proportioned passages and sufficient volume capacity within the crankpin can absorb a quantity of otherwise available power, and due to the losses involved, increase the temperature of the moving cylinders and crosshead 30 from which they extend. Since the crosshead is directly adjacent to the crankshaft and bearing configuration, an abnormal increase in temperature can have undesirable effects upon these elements and upon lubrication provided for them. It is therefore necessary to insure that the engine has sufficient volumetric capacity within the charge induction system to avoid any degree of compression.

In the embodiment of the invention shown in FIG. 22, there is included stationary cylinders 200 and 201 within which are disposed pistons 202 and 203. The pistons extend from crosshead 204 which is mounted upon crankpin 205. Shaft 199, which is similar to shaft 42 of engine 23 in FIG. 2 extends through the crankpin. The remainder of the engine beyond the portions shown in FIG. 16 is substantially identical with that of engine 23 shown in FIGS. 2 and 3. Thus crankpin 205 is coupled in the manner of crankpin 26 to the driving arrangement shown in FIG. 4. In this way the reciprocating motion of pistons 202 and 203 is converted into rotating motion similarly as in the case of engine 23.

As in engine 23, crankpin 205 contains the valving arrangement for conducting and timing the flow of charge to the cylinders. Moving cylinders 206 and 207 which also are mounted upon crosshead 204 extend about flanges 208 and 209 of cylinders 200 and 201, respectively, and are sealed by piston rings 210. As a result, movement of cylinders 206 and 207 causes them to interact with the faces of flanges 208 and 209 which serve as stationary pistons 211 and 212. As a result the moving cylinders are made available to draw in and to pump the charges to cylinders 200 and 201.

FIG. 16 corresponds to the portion of the engine operating cycle shown in FIG. 22. A charge is induced into the moving cylinders from outside of the engine by flowing through intake openings 213 into the interior of crankpin 205 and subsequently from the interior through intake slots 214 into the moving cylinders. Flow from the outside of the engine which enters into crankpin 205 through intake openings 213 in the opposite end portions of the crankpin is analogous to flow through openings 54 in crankpin 26 (FIGS. 5 and 6.). In this way intake slots 214, alternately align with ports extending into cylinders 206 and 207 when these cylinders are on their suction stroke. As shown in FIG. 16, piston 202 is about to move upwardly so that the suction stroke for cylinder 207 is about to begin. At this point flow is about to pass through intake opening 213 into the crankpin from the outside of the engine, through intake slots 214 in the crankpin, and into the interior of cylinder 207.

Further as shown in FIG. 16, slot 215 centrally disposed along the length of crankpin 205, is about to connect to bore 216 extending through piston 202. As delivery slot 215 begins to pass over the opening of bore 216, transfer slots 217 begin to communicate with ports 218 extending through the crosshead into cavity 219 within piston 202 (FIG. 22). Cavity 219 can serve as a reservoir for storing a portion of the charge being pumped by cylinder 206. Since transfer slots 217 are connected to central passage 220 which in turn is connected to delivery slot 215, cavity 219 is placed in connection with bore 216. In this way, any pressured charge within the cavity can flow ultimately into bore 216.

The incoming charge passing upwardly through bore 216 enters cylinder 200 and scavenges the exhaust gas outwardly through exhaust ports 221. The volume of fluid introduced into cylinder 200 will be equal to the amount pumped by cylinder 206 since a smaller delivery would result in build-up of pressure in cavity 219 and associated areas while too large a delivery would eventually evacuate these spaces.

Figure 17:
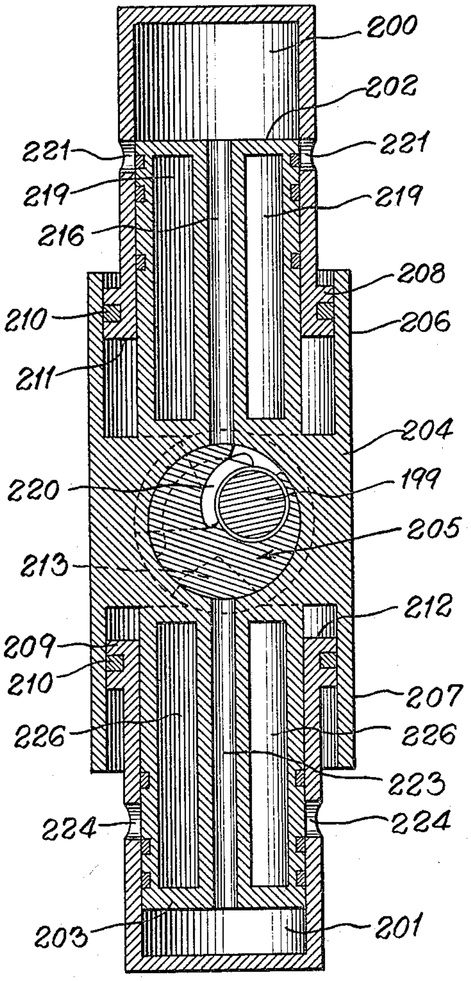

As shown in FIG. 17, upon additional clockwise rotation of crankpin 205, delivery slot 215 begins to pass beyond bore 216 and to terminate the charging of cylinder 200. At this point, transfer slot 217 remains in communication with ports 218 leading into cavity 219. In addition, compression slots 222 begin to communicate with cylinder 206 which is still undergoing its compression stroke. Compression slots 222, which extend radially inwardly into central passage 220 transfer the charge being pumped by cylinder 206 into transfer passage 217 and thereby through ports 218 into cavity 219. Since delivery slot 215 has practically passed beyond bore 216, the pressured charge transmitted by compression slot 222 is safeguarded from being wasted by being expanded through bore 216 and out through exhaust ports 221.

Figure 18:
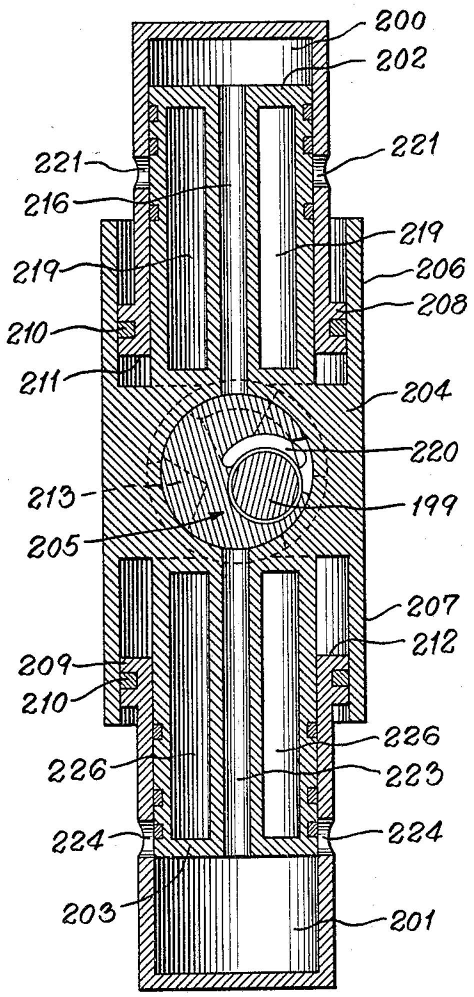

As shown in FIG. 18, the compression stroke of cylinder 206 is approaching the end of its travel and the charge being compressed by cylinder 206 continues to flow into compression slot 222 and through transfer slot 217 and ports 218 into cavity 219. At the same time, the suction stroke of cylinder 207 continues with flow entering through intake opening 213 and intake slot 214. In addition moving piston 203 is experiencing the power portion of its cycle and is being urged upwardly as viewed in FIG. 18.

Figure 19:
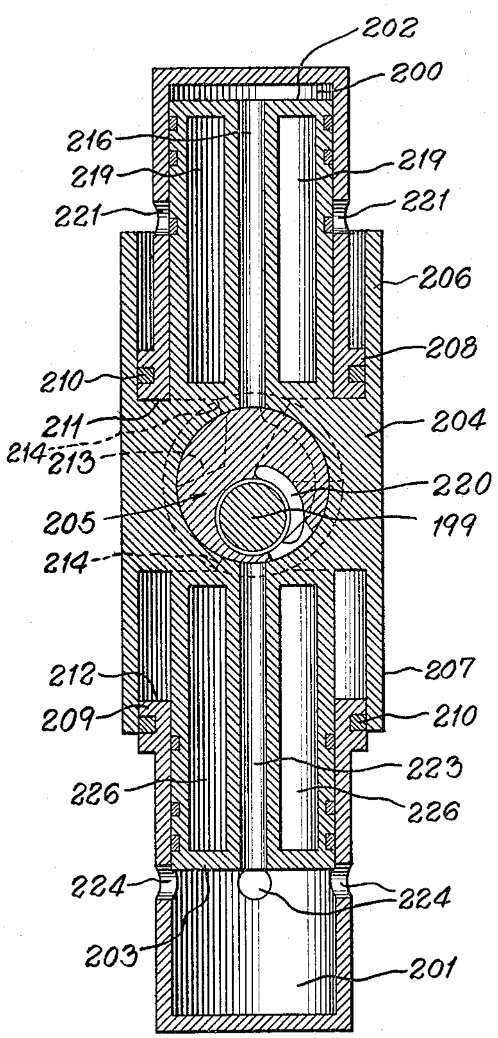

In FIG. 19, piston 203 is moved to a position at which exhaust ports 224 are uncovered. Consequently the power portion of the cycle has been completed and the exhaust can pass from cylinder 201 through exhaust 224. Since intake slot 214 has passed beyond the bores leading to cylinder 207, the flow of charge into moving cylinder 207 is completed as shown in FIG. 19. At the same time piston 202 has substantially completed the compression portion of its cycle of operation. Similarly, stationary piston 211 has completed the pumping of a new charge through compression slot 222 and transfer slot 217 into cavity 219 by way of ports 218. The approach of delivery slot 215 to adjacent bore 223 as shown in FIG. 19 indicates that the delivery of charge to cylinder 201 is about to begin. At this point, flow of the incoming charge through the bore can scavenge exhaust products from cylinder 201 and out through exhaust ports 224.

Figure 20:
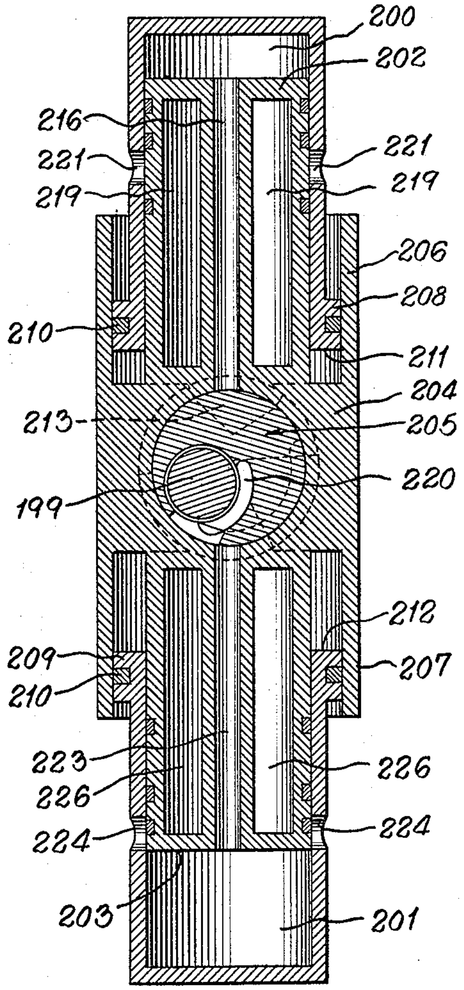

In FIG. 20 the admitting of charge through delivery slot 215 through bore 223 is substantially completed so that the scavenging of exhaust gas through exhaust ports 224 has been completed. Since moving cylinder 207 has begun its descent with respect to piston 212, the delivery of charge from cylinder 207 into compression slot 222 is about to begin. The compressed fluid will then be delivered from slot 222 and ultimately through transfer slots 217 and ports 225 (FIG. 22) into reservoir or cavity 226 within piston 203. Also as shown in FIG. 20, intake slots 214 have entered into communication with cylinder 206 and thereby a fresh charge is induced through intake openings 213 into the downwardly moving cylinder.

Figure 21:
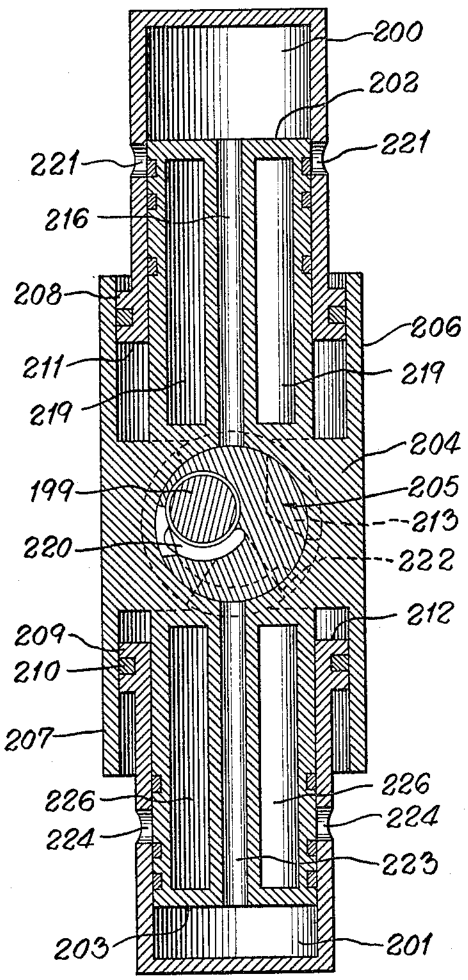

In FIG. 21, the delivery of the charge into reservoir 226 from cylinder 207 is approaching completion at the same time intake to cylinder 206 through intake slots 214 is approaching completion. In the manner described, the engine operates through one cycle.

In the cycle described, the charge being compressed by a given moving cylinder is delivered to the cavity or reservoir in the moving piston adjacent to the moving cylinder. In accordance with the invention, the valving arrangement within crankpin 205 can be conditioned to momentarily store the charge in other cavity arrangements such as in the cavity opposite to the moving cylinder in which the charge is being compressed or in the cavities of both of the moving pistons. The operating characteristics of a particular engine determine the specific valving arrangement, but in any event, the design is governed by the need to provide a sufficient reservoir for the charge being delivered by the moving cylinder so that excessive compression of a charge does not occur. In this way, a high efficiency can be maintained.

Besides providing the necessary storage capacity for receiving the charge being pumped by the moving cylinders, the reservoir arrangement within the moving pistons provides the additional advantage of enabling the charge to cool the pistons. Furthermore, a certain amount of the heat transferred from the pistons to the charge is made available to the cycle of operation within cylinders 200 and 201. In addition the reservoir function is added to the engine arrangement such as engine 23 without the need of any increase in the size of any of the moving or stationary parts of the engine. Thus the unused volume within the moving pistons is made available to perform a useful function without affecting the size envelope of the engine.

From the description above, it can be understood that for each compression stroke of one of cylinders 206 and 207, the reservoir of the piston disposed opposite thereto receives a fresh charge. At the same time the moving cylinder undergoing an intake stroke is drawing in a new charge from without the engine.

Since the principal function of the reservoir arrangement is to eliminate unwanted compression of the charge, one or both of the reservoirs within the pair of pistons can be employed. To accomplish this, the valving sequence is varied to enable either moving cylinder to deliver charge through the crankpin passages to both reservoirs. The selection of one or both reservoirs is determined by the characteristics, such as displacement of a particular engine.

Figure 23:
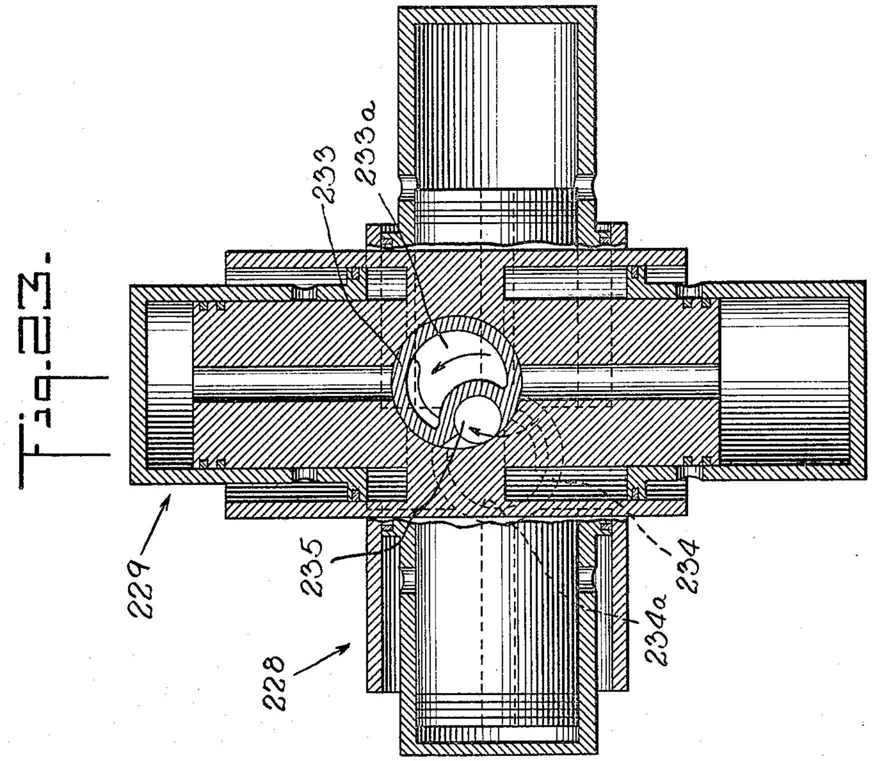
Figure 24:
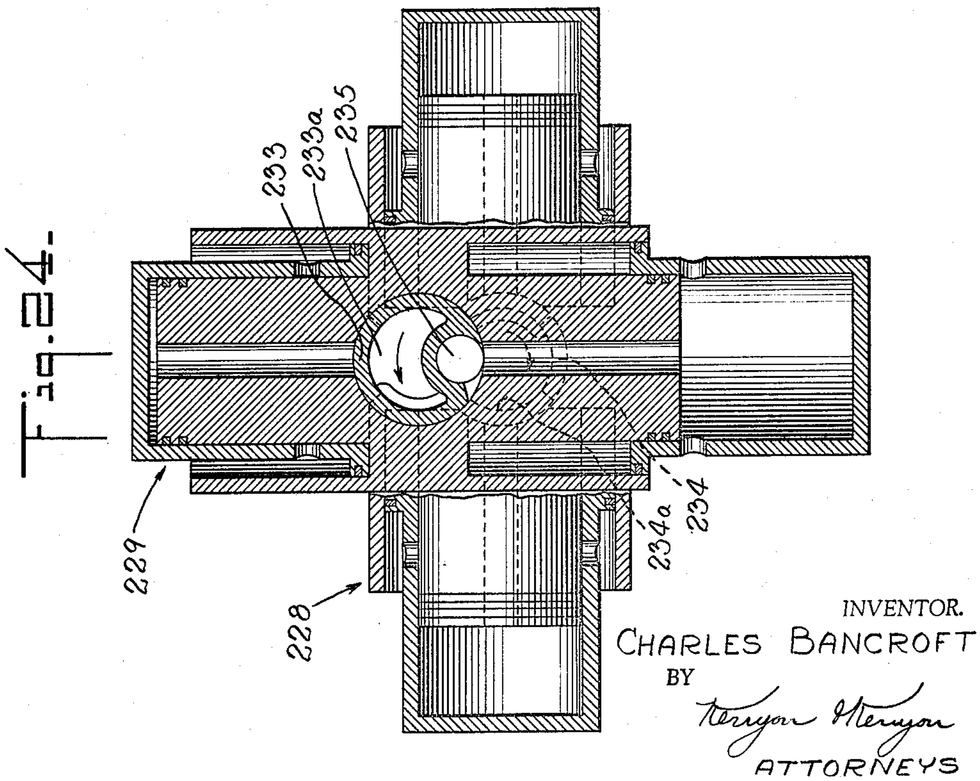
Figure 25:
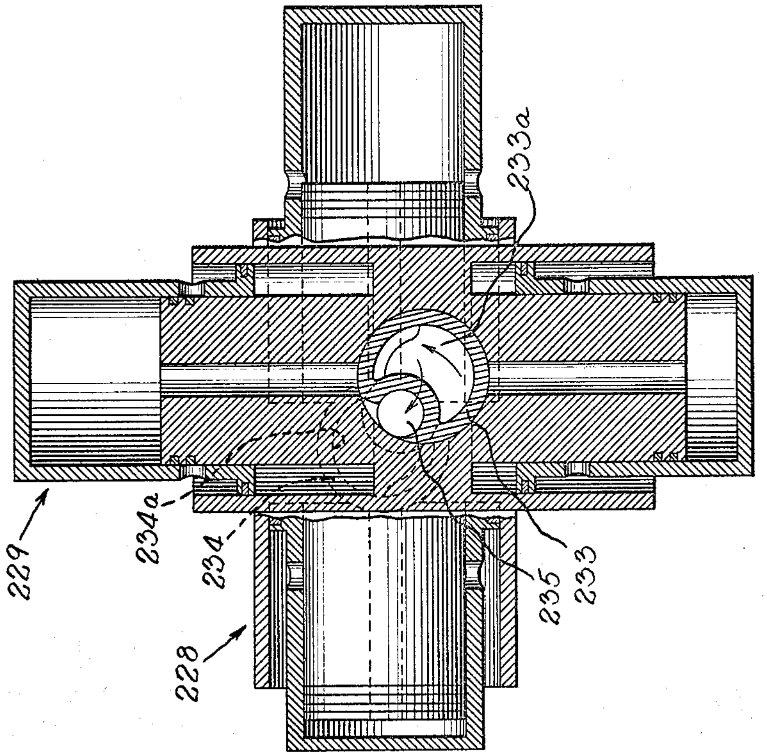
Figure 26:
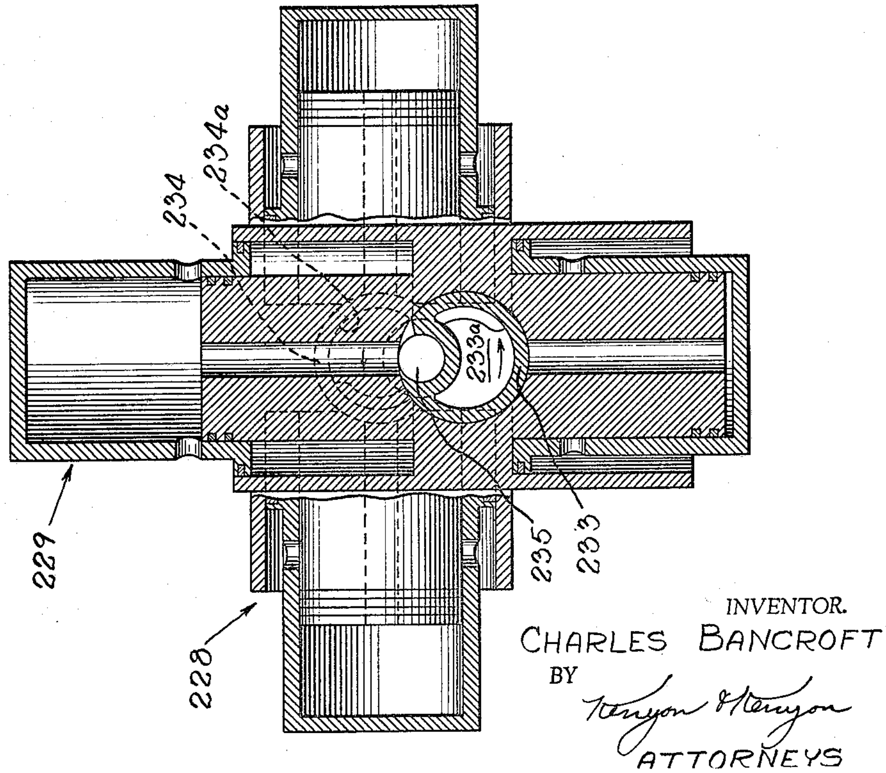

In the additional embodiment of the invention shown in FIGS. 23 and 24, cylinder assemblies 228 and 229 can be mated together in a right angle relationship similar to the pair of assemblies shown in FIG. 13. Each of the pairs of assemblies is provided with the driving arrangement such as shown in FIG. 4. Assemblies 228 and 229 include crankpins 233 and 234, respectively. Since the ports of both pairs of the assemblies are interconnected by means of common manifold 235, gas pumped by the cylinders is always able to discharge above the piston of one of the cylinders. Therefore no storage space to avoid excessive compression of gases prior to delivery to cylinders is needed in this form of the engine. The interconnected cavity construction can be achieved in the device of FIG. 13 by providing a passage connecting the discharges from the various cylinders.

The valving cycle under the control of the crankpins for the configuration of FIGS. 23 and 24 is similar to that of engine 71 shown in FIG. 13. Thus, the crankpin arrangement substantially corresponds to that of crankpins 75 and 92.

FIG. 27 shows another embodiment of the internal combustion engine or gas generator of the invention, that is engine 240. Engine 240 includes two piston and cylinder assemblies 241 and 242. Each of assemblies 241 and 242 have correspondingly similar parts. Stationary cylinders 243 extend inwardly from cylinder heads 244 which are mounted upon crankcase 245. Stationary pistons 246 which are annular in form are supported by sleeves 247 which are disposed concentrically with respect to stationary cylinder 243. Flanges 247*a* mount the sleeves upon the crankcase.

Moving pistons 248 which are rigidly connected to one another are pivotally mounted upon crankpin 249 of crankshaft 250. Moving cylinders 251 are concentrically disposed with respect to moving pistons 248 and are similarly pivotally mounted with respect to crankpin 249. Adjacent to the crankpin, the moving cylinders and pistons are fixedly connected to one another so as to maintain their concentric relationship. Moving cylinders 251 engage the outer circumference of stationary pistons 246 and are sealed with respect thereto by piston rings 252. Stationary pistons 246 at their inner circumference are provided with piston rings 253 for sealing with respect to moving pistons 248. Moving pistons 248 are provided with piston rings 254 for sealing them with respect to the inner walls of stationary cylinders 243.

At the inner ends of each of the piston and cylinder assemblies, moving cylinders 251 are sealed with respect to crankshaft 250 by labyrinth seals 255 which are concentrically disposed and in mating engagement with one another. Sealing at the other ends is accomplished by means of O-rings 255*a*. The axis of movement of the pistons and cylinders in assembly 241 extends parallel to the plane of the drawing while the axis of movement of assembly 242 extends at right angles to the plane of the drawing. Crankshaft 250, at each of its opposite end portions, has counterweights 256 integrally attached thereto. The outer race of each of ball bearings 257 is mounted within a bore in each of the counterweights. The inner races of ball bearings 257 is supported by shoulders 251*a* extending from moving cylinder 251. In this way, each of the crankpins and consequently the crankshaft, is positioned with respect to the moving piston and cylinder assemblies.

Each of counterweights 256 is provided with journal 256*a* which extends through the inner race of ball bearing 258. The outer race of each of ball bearings 258 is mounted within a different one of sliding blocks 259. Adjacent to piston and cylinder assembly 242, sliding block 259 is adapted to move with respect to slideways 260*a* which extends parallel to the plane of FIG. 27. Slideways 260*a* are located in crankshaft support 260. The sliding block adjacent to piston and cylinder assembly 241 moves along an axis which extends at right angles to the plane of the drawing. Similar slideways 260*b* are provided in crankshaft support 260 at right angles to slideways 260*a* in order to restrain cylinders 251 to linear motion by engagement with bearing pads 251*c* provided on the cylinders. With this arrangement, it can be seen that the need for connecting rods conventionally used in reciprocating engines, is eliminated. Each of the sliding blocks adjacent to a piston and cylinder assembly is confined to linear motion by the slideways along axes which are disposed at right angles to one another. Each of the sliding blocks supports one of the crankpins of the crankshaft so that the crankpins are each confined to linear motion in a direction perpendicular to that of the other with the path of each intersecting at the central axis of the engine. With this construction, the crankshaft can be strongly supported. In addition, the sliding block construction results in the rotation of the crankshaft on its own axis to cause contra-rotation of the crankshaft axis about the point of intersection of the linear paths of the crankpin, that is to say, the central axis of the engine.

Output shafts 261, each of which rotate in the same direction as viewed from one end of the engine, are supported by bearings 262 which are mounted in end supports 263 attached to the crankcase. The output shafts each include annular groove 261*a* adjacent to journal 261*b*. Slots 261*c* connect groove 261*a* to the interior of the shaft adjacent to journal 261*b* which is supported by ball bearing 264.

Extending from output shaft 261 adjacent journal 261*b* is counterweight 261*d* which includes rim portion 261*e* (FIG. 27) and relieved portion 261*f* (FIG. 28). Counterweight 265 having journal 265*a* extending therefrom, is keyed to counterweight 261*d* by being disposed within relieved portion 261*f* thereof. Boss 265*b* (FIG. 27) increases the mass of counterweight 265 adjacent to its periphery. In addition, counterweight 265 is provided with lug 265*c* which engages the lower portion of counterweight 261*d* as seen in FIG. 28. By being disposed in relieved portion 261*f*, and by virtue of the engagement of lug 265*c*, counterweight 265 is keyed to counterweight 261*d* while providing a degree of radial movement with respect to one another. This arrangement insures that forces resulting from any possible misalignment are not transmitted by journal 265*a* to the output shaft 261.

Counterweight 265, by means of journal 265*a*, is pivotally engaged through needle bearing 266 mounted in counterweight 256 of the crankshaft. Journals 265*a* each engage counterweights 256 along the axis of rotation of the crankshaft. Thus, output shafts 261 are rotatably mounted on the central axis of the engine and are each connected to a different one of journals 265*a* which rotatably engage the crankshaft on its axis of rotation. As a result when crankshaft 250 orbits around the central axis of the engine, output shafts 261 are forced to turn with it or vice versa.

It can be seen that the reciprocation of the moving pistons and cylinders of each of the assemblies is obtained by the simultaneous and balanced rotation of the component parts about three separate axes. The moving pistons and cylinders are pivotally engaged about the axis of each of the crankpins. The crankshaft rotates about its own axis and, at the same time, it bodily rotates about the central axis of the engine.

With the arrangement of engine 240, it is possible to divide the weight of the counterbalance requirements into two counterweights, that is counterweight 256*a* of the crankshaft and the counterweight system of the output shaft which includes counterweights 261*d* and 265. This arrangement enables the total weight of the counterbalances to be distributed between the output shaft bearings and the crankshaft bearings. In addition it enables a degree of unbalance, so far as the crankshaft alone is concerned, to be efficiently used to oppose the inward radial forces created by compression and firing of the gases in the stationary cylinders. As a result, the loads applied to the sliding block bearing arrangement can be materially reduced during the high speed portions of their reciprocating cycles with an accompanying reduction in friction and wear.

The operating charge of the engine enters through intake ports 267 which lead to annular grooves 261*a* associated with each of the output shafts. The charge then passes through slots 261*c*, the interior of journal 261*b*, and the interior of journal 265*a*. After passing through the interior of journals 265*a*, the charge enters into cavity 249*a* within each of the crankpins. A valving arrangement between cavity 249*a* and the interior of each of the moving cylinders 251, similar to the valving arrangement discussed above, enables the charge to be admitted to the moving cylinders. Thus slots 249*b* when in communication with the moving cylinders delivers charge to them. The charge being pumped by any one of the moving cylinders in conjunction with the stationary pistons disposed therein is delivered to manifold 250*a* which extends through the crankshaft including each of the crankpins. The manifold can act as a receiver for at least a portion of the charge being pumped from within a moving cylinder for delivery to passage 248*a* within each of the moving pistons. Openings 250*b* extending into the manifold enable the charge to be pumped from the moving cylinders into the manifold. Openings 249*c* in the crankpins enable the charge to pass from manifold 250*a* into passage 248*a* of the moving piston.

Therefore, an incoming charge enters the engine by way of intake port 267, passes through the interior of the output shaft, and passes through journal 265*a* of counterweight 265 before entering cavity 249*a* of the crankpin. From here suction within a given moving cylinder draws the charge through slots 249*b*. As the moving cylinder approaches stationary piston 246, the charge is pumped through openings 250*b* into manifold 250*a*. The manifold both serves as a receiver for the charge and the means for delivering it to passage 248*a* extending through the moving piston. Radially extending openings 248*b* in the moving pistons enable the charge to be delivered to transfer recesses 268 which enable the charge to flow about the piston head of the moving pistons when it is at the bottom of its stroke.

The exhaust products pass from the engine by way of exhaust port 269 (FIG. 29) disposed in cylinder head 244 (FIGS. 27 and 28). Flow through the exhaust port is controlled by exhaust valve 270. Rocker arm 271 for operating valve 270 is actuated by push rod 272 engaged with tappet 273. Crankshaft 250 is provided with two cams or ramps 250*c*, each of which is adapted to engage with the valve tappet 273 of one pair of cylinders. As shown with respect to piston and cylinder assembly 242 in FIG. 27, the reciprocating linear motion of moving cylinder 251 serves to translate cam 251*b* with respect to tappet 273. Tappet 273 is restricted by bore 245*a* to move along a line at right angles to the movement of moving cylinder 251. Consequently, cams 250*c* can cyclically reciprocate tappet 273 and thereby operate rocker arm 271 through push rod 272. In this way, the crankshaft directly controls the exhaust valve actuation and timing and thereby eliminates the need of a separate cam drive.

In engine 240, the intake is controlled by moving cylinders 251 and consequently any desired degree of supercharging can be obtained by merely changing the inside diameter of the moving cylinders with respect to the inside diameter of the stationary cylinders. With the valving arrangement within the crankpin, it is possible to eliminate any unswept area of moving cylinder 251 with respect to stationary piston 246. As a result, the volumetric efficiency of supercharging by the moving cylinders can be made to be very efficient. As a result, engine 240 is particularly adapted for compounding or for use as a gas-generator.

Various forms of firing and scavenging can be satisfactorily used for an engine of the type of engine 240. Thus, piston control of the exhaust can in certain cases be substituted for the exhaust valve. In addition, various types of cross or loop scavenging can be employed. Although spark ignition is shown for engine 240 in FIG. 27, compression ignition can also be used. For the purpose of lubrication, lubricating oil can be introduced with the incoming charge or, in the alternative, a crankcase lubricating system can be used.

The operating principle of the four cylinder engine, that is engine 240, is substantially the same as with the two cylinder arrangement previously described. However, one difference is that with the four cylinder arrangement, transfer manifold **250*a*** disposed within the crankshaft makes storage cavities within the moving pistons unnecessary since the gases pumped by the cylinders have an almost continuous opportunity to pass into the cylinders. Without the manifold in the crankshaft in the four cylinder engine, excessive pressure could develop and cause a power loss since the bypass slots in the cylinder walls of each pair of cylinders are shut during at least a portion of the stroke during which transfer takes place from the moving cylinder. In the four cylinder engine, since one of the four pistons is always near the bottom of the stroke during the major part of any of the transfer strokes from the moving cylinder, no storage space or reservoir is needed.

The embodiments of the invention shown in FIGS. 16 and 23 can be employed as a pressured hot gas generator. Thus, the device can be employed in prior art assemblies which utilize a hot gas generator such as a free piston engine. In such an application the hot gas from exhaust ports 221 and 224 would be directed to an engine unit such as a turbine. Where the device of FIG. 16 is employed as an engine or a hot gas generator, the output of the device can be increased by the use of an exhaust valve or valves in place of the exhaust ports in the stationary cylinders. Thus, for example, in the head portions of cylinders 200 and 201 there would be provided one or more exhaust valves which would operate by suitable linkage such as pushrods and the like connected to crankpin 205. With such an arrangement, the device would still be charged by flow through the bores extending through the pistons and the exhaust flow path would be through the engine operated exhaust valves. In place of the direct passage from the bore extending through the moving pistons such as bores 216 and 223, the porting arrangement similar to that shown in FIG. 2 and including recesses 62 and 68 can be employed.

It should be understood that in the embodiments including pumps and compressors, pressured fluid can be delivered to the devices in order to cause them to operate as fluid actuated motors.

What is claimed:

1. A fluid displacement device comprising a crankshaft having one or more crankpins, a corresponding number of pairs of pistons, cylinders rotatably mounted on the crankpins of said crankshaft, means for causing said crankshaft to revolve in an orbit around a fixed axis while, at the same time, rotating on its own axis in the opposite direction, and means disposed within said crankshaft for controlling the flow of fluid with respect to said cylinder adjacent thereto in response to the movement of said crankshaft.

2. A fluid displacement device comprising a crankshaft having one or more crankpins, a corresponding number of pairs of pistons, cylinders rotatably mounted on the crankpins of said crankshaft, means for causing said crankshaft to revolve in an orbit around a fixed axis while, at the same time, rotating on its own axis in the opposite direction, and means disposed within said crankpins for controlling the flow of fluid with respect to said cylinder adjacent thereto in response to the movement of said crankshaft.

3. A fluid displacement device comprising a crankshaft having a plurality of crankpins, a corresponding number of pairs of pistons intersecting on a common axis, cylinders mounted on said pistons and rotatably engaging said crankpins, said pistons and cylinders cooperating to confine said crankshaft into a circular orbit around a first axis of the intersection of said pistons when it is rotated on its own second axis, a counterbalance rotatably mounted on a third axis corresponding to said first axis of the intersection of the cylinders and rotatably engaging said crankshaft at a point eccentric to its own center of rotation and corresponding to said second axis of the crankshaft, means for coupling said counterbalance to an external shaft, and means disposed within said crankpins for controlling the flow of fluid with respect to said cylinders adjacent thereto in response to the movement of said crankshaft.

4. A fluid displacement device comprising a crankshaft having one or more crankpins, pairs of pistons corresponding in number to the number of crankpins, open-ended cylinders reciprocating on said pistons and rotatably engaging said crankpins at the midpoints of said open-ended cylinders, means for causing said crankshaft to revolve in a circular orbit around a fixed axis while at the same time, rotating on its own axis in the opposite direction, and means disposed within said crankpin for controlling the flow of fluid with respect to the cylinders adjacent thereto in response to the movement of said crankshaft.

5. A fluid displacement device comprising a crankshaft having a plurality of crankpins, pairs of pistons corresponding in number to the number of said crankpins and intersecting a common first axis at their midpoints, open-ended cylinders rotatably mounted at their midpoints on the crankpins of said crankshaft, said pistons and cylinders cooperating to confine said crankshaft in an orbit around said first axis of intersection of the pairs of pistons while at the same time said crankshaft rotates about a second axis in the opposite direction, a counterbalance rotatably mounted on a third axis corresponding to said first axis of intersection of the pairs of pistons and rotatably engaging said crankshaft at a point corresponding to said second axis of said crankshaft and eccentric to said third axis, means for coupling said counterbalance to a shaft external of said device, and means disposed within said crankpins for controlling the flow of fluid with respect to the cylinders adjacent thereto in response to the movement of said crankshaft.

6. A fluid displacement device comprising a first pair of fixed opposed pistons, a first pair of fixed opposed cylinders disposed adjacent to said first pair of fixed pistons, a second pair of movable opposed pistons, a second pair of movable opposed cylinders disposed adjacent to said second pair of movable pistons, said first pair of fixed pistons being engaged with said second air of movable cylinders, said second pair of movable pistons being engaged with said first pair of fixed cylinders, a crankshaft having a crankpin pivotally engaged with one of said second pair of movable pistons and said second pair of movable cylinders, said crankpin being adapted to reciprocate along a line substantially parallel to the line of movement of said movable pistons and cylinders, means within said crankpin for controlling the flow of fluid with respect to said fixed and movable cylinders, and means for revolving said crankshaft in response to the reciprocation of said crankpin.

7. A fluid displacement device comprising a first pair of fixed opposed pistons, a first pair of fixed opposed cylinders disposed concentrically with respect to said first pair of fixed pistons, a second pair of movable opposed pistons, a second pair of movable opposed cylinders disposed concentrically with respect to said second pair of movable pistons, said first pair of fixed pistons being engaged with said second pair of movable cylinders, said second pair of movable piston being engaged with said first pair of fixed cylinders, a crankshaft having a crankpin pivotally engaged with one of said second pair of movable pistons and said second pair of movable cylinders, said crankpin being adapted to reciprocate along a line substantially parallel to the line of movement of said movable pistons and cylinders, means within said crankpin for controlling the flow of fluid with respect to said fixed and movable cylinders, and means for revolving said crankshaft in response to the reciprocation of said crankpin.

8. A fluid displacement device comprising a first pair of fixed opposed pistons, a first pair of fixed opposed cylinders disposed concentrically with respect to said first pair of fixed pistons, a second pair of movable opposed pistons, a second pair of movable opposed cylinders disposed concentrically with respect to said second pair of movable pistons, said first pair of fixed pistons being engaged with said second pair of movable cylinders, said second pair of movable pistons being engaged with said first pair of fixed cylinders, a crankshaft having a crankpin pivotally engaged with said second pair of movable pistons and said second pair of movable cylinders and in response thereto traveling along a line substantially parallel to the line of movement of said movable pistons and cylinders, means within said crankpin for controlling flow into said first pair of fixed cylinders, means within said crankpin for controlling flow from said first pair of fixed cylinders to said second pair of movable cylinders, an external shaft adapted to be rotated, and means for converting the motion of said crankshaft in response to the movement of said crankpin to the rotational motion of the external shaft.

9. A fluid displacement device comprising a first pair of fixed opposed pistons, a first pair of fixed opposed cylinders disposed concentrically with respect to said first pair of fixed pistons, a second pair of movable opposed pistons, a second pair of movable opposed cylinders disposed concentrically with respect to said second pair of movable pistons, said first pair of fixed pistons being engaged with said second pair of movable cylinders, said second pair of movable pistons being engaged with said first pair of fixed cylinders, a crankshaft having a crankpin pivotally engaged with said second pair of movable pistons and said second pair of movable cylinders and in response thereto traveling along a line substantially parallel to the line of movement of said movable pistons and cylinders, means within said crankpin for sequentially controlling flow with respect to a different one of said first pair of fixed cylinders, means within said crankpin for sequentially controlling flow from said different one of said first fixed cylinders to one of said second movable cylinders disposed adjacent to the other one of said first fixed cylinders, an external shaft adapted to be rotated, and means for converting the motion of said crankshaft in response to the movement of said crankpin to the rotational motion of the external shaft.

10. A fluid displacement device comprising a pair of fixed opposed pistons, a pair of movable opposed cylinders disposed concentrically with respect to said pair of fixed pistons, a crankshaft having a crankpin pivotally engaged with said pair of movable cylinders and in response thereto traveling along a line substantially parallel to the line of movement of said movable cylinders, means within said crankpin for controlling flow into said movable cylinders, means disposed adjacent said fixed pistons for controlling flow out of said movable cylinders in response to the movement thereof, an external shaft adapted to be rotated, means for converting the motion of said crankshaft in response to the movement of said crankpin to the rotational motion of the external shaft.

11. A fluid displacement device comprising a pair of opposed cylinders, a pair of opposed pistons, each of said pair of pistons being disposed in a different one of said pair of cylinders, one of said pairs of cylinders and pistons being stationary, the other of said pairs of cylinders and pistons being connected to one another, a crankshaft having a crankpin pivotally engaged with said other of said pairs, said crankpin traveling along a linear path in conjunction with the relative movement of said pistons and said cylinders, a shaft for rotatively transmitting motion with respect to said device, means for coupling the reciprocating motion of said crankpin to the rotational motion of said shaft, means for conducting fluid in a predetermined direction with respect to said cylinders, means disposed within said crankshaft and in response to the motion thereof for controlling the movement of fluid with respect to said conducting means, and additional means for conducting fluid with respect to said cylinders in a direction opposite to said predetermined direction.

12. A fluid displacement device comprising a pair of opposed cylinders, a pair of opposed pistons, each of said pair of pistons being disposed in a different one of said pair of cylinders, one of said pairs of cylinders and pistons being stationary, the other of said pairs of cylinders and pistons being connected to one another, a crankshaft having a crankpin pivotally engaged with said other of said pairs, said crankpin traveling along a linear path in conjunction with the relative movement of said pistons and said cylinders, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motion of said shaft with the revolving motion of said revolving means, means for conducting fluid in a predetermined direction with respect to said cylinders, means disposed within said crankshaft and in response to the motion thereof for controlling the movement of fluid with respect to said conducting means, and additional means for conducting fluid with respect to said cylinders in a direction opposite to said predetermined direction.

13. A fluid displacement device comprising a pair of opposed cylinders, a pair of opposed pistons connected to one another, each of said pair of pistons being disposed in a different one of said pair of cylinders, a crankshaft having a crankpin pivotally engaged with said pair of pistons, said crankpin traveling along a linear path in conjunction with the movement of said pistons with respect to said cylinders, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motion of said shaft with the revolving motion of said revolving means, means disposed within said crankshaft and in response to the motion thereof for controlling the movement of fluid into said cylinders, and additional means for controlling the movement of fluid out of said cylinders.

14. A fluid displacement device comprising a pair of opposed cylinders, a pair of opposed pistons connected to one another, each of said pair of pistons being disposed in a different one of said pair of cylinders, a crankshaft having a crankpin pivotally engaged with said pair of pistons, said crankpin traveling along a linear path in conjunction with the movement of said pistons with respect to said cylinders, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motion of said shaft with the revolving motion of said revolving means, means for conducting fluid in a predetermined direction with respect to said cylinders, means disposed within said crankshaft and in response to the motion thereof for controlling the movement of the fluid with respect to said conducting means, and additional means for controlling the movement of the fluid with respect to said cylinders in a direction opposite to said predetermined direction.

15. A fluid displacement device comprising a pair of opposed cylinders, a pair of opposed pistons connected to one another, each of said pair of pistons being disposed in a different one of said pair of cylinders, a crankshaft having a crankpin pivotally engaged with said pair of pistons, said crankpin traveling along a linear path in conjunction with the movement of said pistons with respect to said cylinders, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motion of said shaft with the revolving motion of said revolving means, means for conducting the fluid in a predetermined direction toward said cylinders, means disposed within said crankpin and in response to the motion thereof for controlling the movement of the fluid with respect to said conducting means, and additional means for controlling the movement of the fluid out of said cylinders.

16. A fluid displacement device comprising a pair of opposed cylinders, a pair of opposed pistons connected to one another, each of said pair of pistons being disposed in a different one of said pair of cylinders, a crankshaft having a crankpin pivotally engaged with said pair of pistons, said crankpin traveling along a linear path in conjunction with the movement of said pistons with respect to said cylinders, each of said pistons having a passage extending from adjacent said crankpin to said cylinder adjacent thereto, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motion of said shaft with the revolving motion of said revolving means, means disposed within said crankpin and in response to the motion thereof for controlling the movement of the fluid in said passage of each of said pistons in a predetermined direction with respect to said cylinder adjacent thereto, and additional means for controlling the movement of the fluid with respect to said cylinders in a direction opposite to said predetermined direction.

17. A fluid displacement device comprising a pair of opposed cylinders, a pair of opposed pistons connected to one another, each of said pair of pistons being disposed in a different one of said pair of cylinders, a crankshaft having a crankpin pivotally engaged with said pair of pistons, said crankpin traveling along a linear path in conjunction with the movement of said pistons with respect to said cylinders, each of said pistons having a passage extending from adjacent said crankpin to said cylinder adjacent thereto, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motion of said shaft with the revolving motion of said revolving means, means disposed within said crankpin and in response to the motion thereof for controlling the movement of the fluid into said passage of each of said pistons and to said cylinder adjacent thereto, and additional means for controlling the movement of the fluid out of said cylinders.

18. A fluid displacement device comprising a pair of opposed cylinders, a pair of opposed pistons connected to one another, each of said pair of pistons being disposed in a different one of said pair of cylinders, a crankshaft having a crankpin pivotally engaged with said pair of pistons, said crankpin traveling along a linear path in conjunction with the movement of said pistons with respect to said cylinders, said crankshaft containing a hollow interior portion extending to said crankpin, each of said pistons having a passage extending from adjacent said crankpin to said cylinder adjacent thereto, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motions of said shaft with the revolving motion of said revolving means, means disposed within said crankpin and in response to the motion thereof for controlling the movement of the fluid between said hollow interior portion and said passage of each of said pistons in a predetermined direction with respect to said cylinder adjacent thereto, and additional means for controlling the movement of the fluid with respect to said cylinders in a direction opposite to said predetermined direction.

19. A fluid displacement device comprising a pair of opposed cylinders, a pair of opposed pistons connected to one another, each of said pair of pistons being disposed in a different one of said pair of cylinders, a crankshaft having a crankpin pivotally engaged with said pair of pistons, said crankpin traveling along a linear path in conjunction with the movement of said pistons with respect to said cylinders, said crankshaft containing a hollow interior portion extending to said crankpin, each of said pistons having a passage extending from adjacent said crankpin to said cylinder adjacent thereto, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motion of said shaft with the revolving motion of said revolving means, means disposed within said crankpin and in response to the motion thereof for controlling the movement of the fluid from said hollow interior portion and into said passage of each of said pistons to said cylinder adjacent thereto, and additional means for controlling the movement of the fluid out of said cylinders.

20. A fluid displacement device comprising a pair of opposed cylinders, a pair of opposed pistons connected to one another, each of said pair of pistons being disposed in a different one of said pair of cylinders, a crankshaft having a crankpin traveling along a linear path in conjunction with the movement of said pistons with respect to said cylinders, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motion of said shaft with the revolving motion of said revolving means, said crankpin having an opening therein for receiving fluid, means for conducting the fluid toward said cylinders, means disposed within said crankpin and in response to the motion thereof for controlling the movement of the fluid from said opening toward said conducting means, and additional means for controlling the movement of the fluid out of said cylinders in response to the movement of the piston therein.

21. A fluid displacement device comprising a plurality of pairs of opposed cylinders, each of said pairs of cylinders being spaced apart and substantially parallel to one another, a plurality of pairs of opposed pistons connected to one another, each of said plurality of pairs of pistons being disposed in a different one of said plurality of pairs of cylinders, a crankshaft having a plurality of crankpins, each of said crankpins being pivotally engaged with a different one of said plurality of pairs of pistons and traveling along a linear path in conjunction with the movement with respect to said cylinders of said pair of pistons engaged thereto, a shaft for rotatively transmitting motion with respect to said device, means for revolving a portion of said crankshaft about the axis of rotation of said shaft in conjunction with the linear travel of said plurality of crankpins, said revolving means rotating said plurality of crankpins with respect to each of said pairs of pistons adjacent thereto, means for coupling the rotating motion of said shaft with the revolving motion of said revolving means, means for conducting the fluid in a predetermined direction with respect to each of said cylinders, means disposed within said crankshaft and in response to the motion thereof for controlling the movement of the fluid with respect to said conducting means, and additional means for controlling the movement of the fluid with respect to said cylinders in a direction opposite to said predetermined direction.

22. A fluid displacement device comprising two adjacent pairs of opposed cylinders, said pairs of opposed cylinders being disposed in parallel planes, the longitudinal axis of each of the cylinders in one of said pairs being disposed at right angles to the longitudinal axis of each of the cylinders of the other of said pairs, two pairs of opposed pistons connected to one another, each of said pairs of pistons being disposed in a different one of said plurality of pairs of cylinders, a crankshaft having a pair of crankpins offset in diametrically opposite directions from one another, each of said crankpins being pivotally engaged with a different one of said two pairs of pistons and traveling along a linear path in conjunction with the movement with respect to said cylinders of said pair of pistons engaged thereto, a shaft for rotatively transmitting motion with respect to said device, means for revolving a portion of said crankshaft about the axis of rotation of said shaft in conjunction with the linear travel of said plurality of crankpins, said revolving means rotating said plurality of crankpins with respect to each of said pairs of pistons adjacent thereto, means for coupling the rotating motion of said shaft with the revolving motion of said revolving means, means for conducting the fluid in a predetermined direction with respect to each of said cylinders, means disposed within said crankshaft and in response to the motion thereof for controlling the movement of the fluid with respect to said conducting means, and additional means for controlling the movement of the fluid with respect to said cylinders in a direction opposite to said predetermined direction.

23. A fluid displacement device comprising two adjacent pairs of opposed cylinders, said pairs of opposed cylinders being disposed in parallel planes, the longitudinal axis of each of the cylinders in one of said pairs being disposed at right angles to the longitudinal axis of each of the cylinders of the other of said pairs, two pairs of opposed pistons connected to one another, each of said pairs of pistons being disposed in a different one of said plurality of pairs of cylinders, a crankshaft having a pair of crankpins offset in diametrically opposite directions from one another, each of said crankpins being pivotally engaged with a different one of said two pairs of pistons and traveling along a linear path in conjunction with the movement with respect to said cylinders of said pair of pistons engaged thereto, a shaft for rotatively transmitting motion with respect to said device, means for revolving a portion of said crankshaft about the axis of rotation of said shaft in conjunction with the linear travel of said plurality of crankpins, said revolving means rotating said plurality of crankpins with respect to each of said pairs of pistons adjacent thereto, means for coupling the rotating motion of said shaft with the revolving motion of said revolving means, means for conducting the fluid toward each of said cylinders, means disposed within said crankshaft and in response to the motion thereof for controlling the movement of the fluid with respect to said conducting means, and additional means for controlling the movement of the fluid out of said cylinders.

24. A fluid displacement device comprising a pair of opposed stationary cylinders, the facing end portions of said stationary cylinders forming stationary pistons, a base member, a pair of opposed moving pistons extending from said base member, each of said pair of movable pistons engaging the inner surface of a different one of said pair of stationary cylinders, a pair of moving cylinders disposed about and spaced apart from said moving pistons, said pair of moving cylinders extending from said base member with the inner surface of each of said moving cylinders engaging the outer surface of a different one of said pair of stationary pistons, a crankshaft having a crankpin pivotally engaged with said base member, said crankpin traveling along a linear path in conjunction with the movement of said base member, a shaft for rotatively transmitting motion with respect to said device, means for coupling the linear motion of said crankpin to the rotating motion of said shaft, and means disposed in said crankshaft and in response to the motion thereof for controlling the movement of the fluid with respect to each one of said stationary and moving cylinders.

25. A fluid displacement device comprising a pair of opposed stationary cylinders, the facing end portions of said stationary cylinders forming stationary pistons, a base member, a pair of opposed moving pistons extending in opposite directions from said base member, each of said pair of moving pistons engaging the inner surfaces of a different one of said pair of stationary cylinders, a pair of moving cylinders disposed about and spaced apart from said moving pistons, said pair of moving cylinders extending from said base member with the inner surface of each of said moving cylinders engaging the outer surface of a different one of said pair of stationary pistons, a crankshaft having a crankpin pivotally engaged with said base member, said crankpin traveling along a linear path in conjunction with the movement of said base member, a shaft for rotatively transmitting motion with respect to said device, means for revolving a portion of said crankshaft about the axis of rotation of said shaft in conjunction with the linear travel of said crankpin, said revolving means rotating said crankpin with respect to said base member pistons, means for coupling the rotating motion of said shaft with the revolving motion of said revolving means, means disposed in said crankshaft and in response to the motion thereof for sequentially controlling the movement of the fluid with respect to a different one of said moving cylinders, and additional means disposed in said crankshaft and in response to the motion thereof for sequentially controlling the movement from said different one of said moving cylinders to said fixed cylinder of said pair of fixed cylinders disposed adjacent to said different one of said moving cylinders.

26. A fluid displacement device comprising a pair of opposed stationary cylinders, a pair of stationary pistons adjacent thereto, a pair of opposed moving pistons, a pair of opposed moving cylinders adjacent thereto, a crankshaft having a crankpin pivotally engaged with one of said adjacent pairs of moving cylinders and pistons, said crankpin traveling along a linear path in conjunction with the movement of said adjacent pairs, a shaft for rotatively transmitting motion with respect to said device, means for revolving a portion of said crankshaft about the axis of rotation of said shaft in conjunction with the linear travel of said crankpin, said revolving means rotating said crankpin with respect to said base member pistons, means for coupling the rotating motion of said shaft with the revolving motion of said revolving means, means disposed in said crankshaft and in response to the motion thereof for controlling the movement of the fluid into each one of said moving cylinders, and additional means disposed in said crankshaft and in response to the motion thereof for controlling the movement of the fluid into each one of said fixed cylinders.

27. A fluid displacement device comprising a pair of opposed cylinders connected to one another at the closed head portion thereof, a pair of opposed stationary pistons, each of said pair of pistons being disposed in a different one of said pair of cylinders, a crankshaft having a crankpin pivotally engaged with said pair of cylinders, said crankpin traveling along a linear path in conjunction with the movement of said cylinders with respect to said stationary pistons, a shaft for rotatively transmitting motion with respect to said device, means for coupling said crankpin having linear motion to said shaft having rotating motion, means disposed within said crankpin for controlling the movement of the fluid in a predetermined direction with respect to said cylinders in response to the motion of said crankpin, means for conducting the fluid with respect to said pistons in a direction opposite to said predetermined direction, and additional means for controlling the movement of the fluid with respect to said pistons in a direction opposite to said predetermined direction.

28. A fluid displacement device comprising a pair of opposed cylinders connected to one another at the closed head portion thereof, a pair of opposed stationary pistons, each of said pair of pistons being disposed in a different one of said pair of cylinders, a crankshaft having a crankpin pivotally engaged with said pair of cylinders, said crankpin traveling along a linear path in conjunction with the movement of said cylinders with respect to said stationary pistons, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motion of said shaft with the revolving motion of said revolving means, means disposed within said crankpin for controlling the movement of the fluid toward said cylinders in response to the motion of said crankpin, and additional means for controlling the movement of the fluid out of said cylinder.

29. A fluid displacement device comprising a pair of opposed cylinders, an additional pair of opposed cylinders disposed adjacent to said pair of cylinders, said cylinders being disposed in substantially a common plane and extending substantially parallel to one another, a pair of opposed driving pistons connected to one another, each of said pair of driving pistons being disposed in a different one of said pair of cylinders, a pair of opposed driven pistons, each of said pair of driven pistons being disposed in a different one of said additional pair of cylinders, a crankshaft having a crankpin pivotally engaged with said pairs of driving and driven pistons, said crankpin traveling along a linear path in conjuction with the movement of said pair of pistons with respect to said pairs of cylinders, a shaft for rotatively transmitting motion with respect to said device, means for revolving a portion of said crankshaft about the axis of rotation of said shaft in conjunction with the linear travel of said crankpin, said revolving means rotating said crankpin with respect to said pistons, means for coupling the rotating motion of said shaft with the revolving motion of said revolving means, means for conducting fluid toward said pair and said additional pair of cylinders, means disposed within said crankpin and in response to the motion thereof for controlling the movement of the fluid from said conducting means toward said pair and said additional pair of cylinders, and additional means for controlling the fluid out of said pair and said additional pair of cylinders in a direction opposite to said predetermined direction.

30. A fluid displacement device comprising a pair of opposed stationary cylinders, a base member containing a central bore, a pair of moving pistons extending in opposite directions from said base member, each of said pair of pistons engaging the inner surface of a different one of said pair of cylinders and containing a first passage communicating between said base member and said cylinder adjacent thereto, a pair of moving cylinders disposed about and spaced apart from said moving pistons, said pair of moving cylinders extending from said base member with the inner surface of each of said sleeve members engaging the outer surface of a different one of said pair of stationary cylinders, the end portions of said stationary cylinders adjacent thereto serving as a pair of fixed pistons, said base member having a second passage extending from each of said moving cylinders to said bore, a crankshaft having a crankpin pivotally engaged with the base of said base member, said crankpin traveling along a linear path in conjunction with the movement of said base member with respect to said cylinders, a shaft for rotatively transmitting motion with respect to said device, means for coupling said crankpin having linear motion to said shaft having rotational motion, said crankpin having a fluid inlet opening, said crankpin having a third passage extending from said inlet opening to a portion of the circumference of said crankpin which cyclically intersects said second passage extending from one of said moving cylinders in response to the rotation of said crankpin, said third passage being adapted to deliver fluid through said second passage to said different one of said moving cylinders, said crankpin having a fourth passage extending from another portion of the circumference of said crankpin which cyclically intersects said second passage to a further portion of the circumference of said crankpin which intersects said first passage of the piston of the other of said stationary cylinders, the intersecting of said other portion and the said further portion of the circumference of said crankpin being in response to the rotation of said crankpin, said fourth passage being adapted to deliver fluid through said first passage to said cylinder adjacent thereto, and means for releasing fluid from each of said pair of cylinders in response to the movement of the piston therein.

31. A fluid displacement device comprising a double ended moving piston containing cavities within each end portion thereof and having a centrally located flange, open ended cylinders extending from said flange in opposite directions co-axial with said double ended moving piston; a pair of stationary opposed hollow pistons extending into each of said cylinders and each receiving a different end of said double ended moving piston within them, a crankshaft having a crankpin pivotally engaged with the assembly of said double ended moving piston and cylinders adjacent to said centrally located flange, said crankpin being adapted to reciprocate along a line substantially parallel to the line of movement of said doubled ended piston and cylinders, means within said crankpin for controlling the flow of fluid with respect to said stationary opposed hollow pistons and cylinders, said flow controlling means being in a fluid circuit with said cavities for enabling said cavities to serve as a reservoir for the flow, and means for revolving said crankshaft in response to the reciprocation of said crankpin.

32. A fluid displacement device comprising a pair of stationary opposed hollow pistons, a double ended moving piston containing cavities within each end portion thereof and having a centrally located flange, a cylinder disposed co-axially with respect to said double ended piston and divided into two open ended halves by said flange upon which it is mounted, each end of said cylinder receiving one of said pair of stationary hollow pistons and each of said stationary opposed hollow pistons receiving one end of said double ended piston, a crankshaft having a crankpin pivotally engaged with said double ended piston and cylinder adjacent to said centrally located flange, said crankpin being adapted to reciprocate along a line substantially parallel to the line of movement of said doubled ended piston and cylinders, means within said crankpin for controlling the flow of fluid with respect to said stationary opposed hollow pistons and cylinders, said flow controlling means being in a fluid circuit with said cavities for enabling said cavities to serve as a reservoir for the flow, and means for revolving said crankshaft in response to the reciprocation of said crankpin.

33. A fluid displacement device comprising a first pair of fixed opposed pistons, a first pair of fixed opposed cylinders disposed concentrically with respect to said first pair of fixed pistons, a second pair of movable opposed pistons each containing a cavity, a second pair of movable opposed cylinders disposed concentrically with respect to said second pair of movable pistons, said first pair of fixed pistons being engaged with said second pair of movable cylinders, said second pair of movable pistons being engaged with said first pair of fixed cylinders, a crankshaft having a crankpin pivotally engaged with said second pair of movable pistons and said second pair of movable cylinders and in response thereto traveling along a line substantially parallel to the line of movement of said movable pistons and cylinders, first means within said crankpin for sequentially controlling flow with respect to a different one of said second pair of movable cylinders, second means within said crankpin for sequentially controlling flow from said different one of said second pair of movable cylinders to at least one of said cavities, third means within said crankpin for sequentially controlling flow from at least one of said cavities to one of said first fixed cylinders disposed adjacent to the other one of said second movable cylinders, an external shaft adapted to be rotated, and means for converting the motion of said crankshaft in response to the movement of said crankpin to the rotational motion of the external shaft.

34. A fluid displacement device comprising a pair of opposed cylinders, a pair of opposed pistons, each of said pair of pistons being disposed in a different one of said pair of cylinders, one of said pairs of cylinders and pistons being stationary, the other of said pairs of cylinders and pistons being connected to one another, each of the pistons of one of said pair of cylinders and pistons containing a cavity, a crankshaft having a crankpin pivotally engaged with said other of said pairs, said crankpin traveling along a linear path in conjunction with the relative movement of said pistons and said cylinders, a shaft for rotatively transmitting motion with respect to said device, means for coupling the reciprocating motion of said crankpin to the rotational motion of said shaft, means for conducting fluid in a predetermined direction with respect to said cylinders, means disposed within said crankshaft and in response to the motion thereof for controlling the movement of fluid with respect to said conducting means, said controlling means being in communication with said cavities for enabling said cavities to serve as a reservoir for the fluid, and additional means for conducting fluid with respect to said cylinders in a direction opposite to said predetermined direction.

35. A fluid displacement device comprising a pair of stationary cylinders disposed with their open end portions in a facing relationship, the annular face of each of said end portions forming a stationary piston, a crosshead member having a central opening therein, a pair of moving pistons extending oppositely from said crosshead member, each of said pair of moving pistons having a cavity within the interior thereof and engaging the inner surface of a different one of said pair of stationary cylinders, a pair of moving cylinders disposed concentrically about and spaced apart from said moving pistons, said pair of moving cylinders extending from said crosshead member with the inner surface of each of said moving cylinders engaging the outer surface of a different one of said pair of stationary pistons, said crosshead member having first passages extending from said moving cylinders to said central opening, said crosshead member having second passages extending from said cavities to said central opening, and said crosshead member and said moving pistons having third passages extending between the faces of said moving pistons to said central opening, a crankshaft having a crankpin pivotally engaged with said central opening, said crankpin traveling along a linear path in conjunction with the movement of said crosshead member, a shaft for rotatively transmitting motion with respect to said crankpin to the rotating motion of said shaft, and means disposed in said crankpin and in response to the motion thereof for controlling the movement of the fluid with respect to said first, second, and third passages.

36. A fluid displacement device comprising a pair of opposed stationary cylinders, the facing end portions of said stationary cylinders forming stationary pistons, a crosshead member having a central opening, a pair of opposed moving pistons extending in opposite directions from said crosshead member, each of said pair of moving pistons having a cavity within the interior thereof and engaging the inner surface of a different one of said pair of stationary cylinders, a pair of moving cylinders concentrically disposed about and spaced apart from said moving pistons, said pair of moving cylinders extending from said crosshead member with the inner surface of each of said moving cylinders engaging the outer surface of a different one of said pair of stationary pistons, said crosshead member having first passages extending from said moving cylinders to said central opening, said crosshead member having second passages extending from said cavities to said central opening, and said crosshead member and said moving pistons having third passages extending between the faces of said moving pistons to said central opening, a crankshaft having a crankpin pivotally engaged with said central opening, said crankpin traveling along a linear path in conjunction with the movement of said crosshead member, a shaft for rotatively transmitting motion with respect to said device, means for revolving a portion of said crankshaft about the axis of rotation of said shaft in conjunction with the linear travel of said crankpin, said revolving means rotating said crankpin with respect to said crosshead member pistons, means for coupling the rotating motion of said shaft with the revolving motion of said revolving means, first means disposed in said crankpin and in response to the motion thereof for sequentially controlling the movement of the fluid with respect to said first passages, second means disposed in said crankpin and in response to the motion thereof for sequentially controlling the movement of the fluid between said first passages and said second passages, and third means in said crankshaft and in response to the motion thereof for sequentially controlling the movement between said second passages and said third passages.

37. An engine comprising a pair of opposed stationary cylinders, the flanges of said cylinders adjacent the open end portion thereof forming a pair of stationary pistons, a pair of opposed moving pistons each containing a cavity within the interior thereof, a pair of opposed moving cylinders disposed concentrically with respect to said moving pistons, a crankshaft having a crankpin pivotally engaged with said pairs of moving cylinders and pistons, said crankpin traveling along a linear path in conjunction with the movement of said adjacent pairs, a shaft for rotatively transmitting motion with respect to said device, means for revolving a portion of said crankshaft about the axis of rotation of said shaft in conjunction with the linear travel of said crankpin, said revolving means rotating said crankpin with respect to said base member pistons, means for coupling the rotating motion of said shaft with the revolving motion of said revolving means, first means disposed in said crankpin and in response to the motion thereof for controlling the movement of the fluid with respect to said moving cylinders, second means disposed in said crankpin and in response to the motion thereof for controlling the movement of the fluid between the moving cylinders and said cavities, and third means disposed in said crankpin and in response to the motion thereof for controlling the movement of the fluid between said cavities and said fixed cylinders.

38. A fluid displacement device comprising a pair of opposed stationary cylinders, a crosshead member containing a central bore, a pair of moving pistons extending in opposite directions from said crosshead member, each of said pair of moving pistons engaging the inner surface of a different one of said pair of stationary cylinders and having a cavity within the interior thereof, a pair of moving cylinders disposed concentrically with respect to and spaced apart from said moving pistons, said pair of moving cylinders extending from said crosshead member with the inner surface of each of said moving cylinders engaging the outer surface of a different one of said pair of stationary cylinders, the end portions of said stationary cylinders adjacent thereto serving as a pair of fixed pistons, said crosshead member having first passages extending from said moving cylinders to said central bore for conducting fluid to be pumped by said moving cylinder, said crosshead member having second passages extending from said cavities to said central bore, said crosshead and said pair of moving pistons having third passages extending from the faces of the moving piston to said central bore, a crankshaft having a crankpin pivotally engaged with said central bore, said crankpin having a central cavity and traveling along a linear path in conjunction with the movement of said crosshead member with respect to said cylinders, a shaft for rotatively transmitting motion with respect to said device, and means for coupling said crankpin having linear motion to said shaft having rotational motion, said crankpin having an inlet and a first opening extending from said inlet to a portion of the circumference of said crankpin which cyclically intersects a different one of said first passages extending from a different one of said moving cylinders in response to the rotation of said crankpin, said first opening being adapted to deliver fluid through said inlet to said different one of said moving cylinders, said crankpin having a second opening extending from said central cavity thereof to another portion of the circumference of said crankpin which cyclically intersects said first opening, said second opening being adapted to transfer fluid from said different one of said moving cylinders to said central cavity, said crankpin having a third opening extending from said central cavity thereof to a portion of the circumference of said crankpin which cyclically intersects said second passage in said crosshead member, said third opening being adapted to transfer fluid between said central cavity in said crankpin and at least one of said cavities in said pair of moving pistons, said crankpin having a fourth opening extending from said central cavity thereof to a portion of the circumference of said crankpin which cyclically intersects said third passages in said crosshead member, said fourth opening being adapted to transfer fluid cyclically from said central cavity to a different one of said third passages in said crosshead member, whereby an incoming charge of fluid from one of said moving cylinders can be received by at least one of said cavities in said moving pistons before being admitted to said stationary cylinders.

39. A fluid displacement device comprising a pair of opposed stationary cylinders, a crosshead member containing a central bore, a pair of moving pistons extending in opposite directions from said crosshead member, each of said pair of moving pistons engaging the inner surface of a different one of said pair of stationary cylinders and having a cavity within the interior thereof, a pair of moving cylinders disposed concentrically with respect to and spaced apart from said moving pistons, said pair of moving cylinders extending from said crosshead member with the inner surface of each of said moving cylinders engaging the outer surface of a different one of said pair of stationary cylinders, the end portions of said stationary cylinders adjacent thereto serving as a pair of fixed pistons, said crosshead member having first passages extending from said moving cylinders to said central bore for conducting fluid to be pumped by said moving cylinder, said crosshead member having second passages extending from said cavities to said central bore, said crosshead and said pair of moving pistons having third passages extending from the faces of the moving piston to said central bore, a crankshaft having a crankpin pivotally engaged with said central bore, said crankpin having a central cavity and traveling along a linear path in conjunction with the movement of said crosshead member with respect to said cylinders, a shaft for rotatively transmitting motion with respect to said device, means for coupling said crankpin having linear motion to said shaft having rotational motion, said crankpin having an inlet and a first opening extending from said inlet to a portion of the circumference of said crankpin which cyclically intersects a different one of said first passages extending from a different one of said moving cylinders in response to the rotation of said crankpin, said first opening being adapted to deliver fluid through said inlet to said different one of said moving cylinders, said crankpin having a second opening extending from said central cavity thereof to another portion of the circumference of said crankpin which cyclically intersects said first opening, said second opening being adapted to transfer fluid from said different one of said moving cylinder to said central cavity, said crankpin having a third opening extending from said central cavity thereof to a portion of the circumference of said crankpin which cyclically intersects said second passage in said crosshead member, said third opening being adapted to transfer fluid between said central cavity in said crankpin and at least one of said cavities in said pair of moving pistons, said crankpin having a fourth opening extending from said central cavity thereof to a portion of the circumference of said crankpin which cyclically intersects said third passages in said crosshead member, said fourth opening being adapted to transfer fluid cyclically from said central cavity to a different one of said third passages in said crosshead member, and means for releasing fluid from each of said pair of stationary cylinders during a portion of the cycle of operation of the moving piston disposed therein, whereby an incoming charge of fluid from one of said moving cylinders can be received by at least one of said cavities in said moving pistons before being admitted to said stationary cylinders and subsequently released.

40. A fluid displacement device comprising a pair of opposed stationary cylinders, a crosshead member containing a central bore, a pair of moving pistons extending in opposite directions from said crosshead member, each of said pair of moving pistons engaging the inner surface of a different one of said pair of stationary cylinders, and a pair of moving cylinders disposed concentrically with respect to and spaced apart from said moving pistons, said pair of moving cylinders extending from said crosshead member with the inner surface of each of said moving cylinders engaging the outer surface of a different one of said pair of stationary cylinders, the end portions of said stationary cylinders adjacent thereto serving as a pair of fixed pistons, said crosshead member having passages extending from said moving cylinders to said central bore for conducting fluid to be pumped by said moving cylinder, said crosshead and said pair of moving pistons having additional passages extending from the faces of the moving pistons to said central bore; means for releasing fluid from each of said stationary cylinders at a predetermined portion of the cycle of said moving piston therein; a crankshaft having a different crankpin pivotally engaged with said central bore, said crankpin having a central cavity and traveling along a linear path in conjunction with the movement of said crosshead members with respect to said cylinders, said crankshaft having a journal at each end thereof, each of said journals being offset from the crankpin adjacent thereto; a pair of blocks mounted for sliding along a predetermined path, each of said blocks being pivotally connected to a different one of the journals of said crankshaft, the paths of travel of each of the sliding blocks being at right angles to one another and intersecting at the central axis of the fluid displacement device, said sliding blocks upon the reciprocation of said moving piston and cylinder causing the said crankshaft to rotate about its axis of rotation which extends along the central axis of the device; and a shaft for rotatively transmitting motion with respect to said device, the axis of said shaft extending along the central axis of the device, said shaft having an additional crankpin offset from the central axis and pivotally engaged with said crankshaft; said crankpin of said crankshaft having an inlet and a first opening extending from said inlet to a portion of the circumference of said crankpin which cyclically intersects a different one of said passages of said unit extending from a different one of said moving cylinders of said unit in response to the rotation of said crankpin, said first opening being adapted to deliver fluid through said inlet to said different one of said moving cylinders, said crankpin having a second opening extending from said central cavity thereof to another portion of the circumference of said crankpin which cyclically intersects a different one of said passages in said crosshead member, said second opening being adapted to transfer fluid from said different one of said moving cylinder to said central cavity, said crankpin having a third opening extending from said central cavity thereof to a portion of the circumference of said crankpin which cyclically intersects a different one of said additional passages in said crosshead member, said third opening being adapted cyclically to transfer fluid between said central cavity in said crankpin and said additional passages of a different one of said pair of moving pistons, whereby an incoming charge of fluid from each of said moving cylinders can be received by the cavity of the crankpin before being admitted to each of said stationary cylinders.

41. A fluid displacement device comprising a pair of opposed stationary cylinders, a crosshead member containing a central bore, a pair of moving pistons extending in opposite directions from said crosshead member, each of said pair of pistons engaging the inner surface of a different one of said pair of stationary cylinders, and a pair of moving cylinders disposed concentrically with respect to and spaced apart from said moving pistons, said pair of moving cylinders extending from said crosshead member with the inner surface of each of said moving cylinders engaging the outer surface of a different one of said pair of stationary cylinders, the end portions of said stationary cylinders adjacent thereto serving as a pair of fixed pistons, said crosshead member having passages extending from said moving cylinders to said central bore for conducting fluid to be pumped by said moving cylinder, said crosshead and said pair of moving pistons having additional passages extending from the faces of the moving piston to said central bore; a crankshaft having a a different crankpin pivotally engaged with said central bore, said crankpin having a central cavity and traveling along a linear path in conjunction with the movement of said crosshead members with respect to said cylinders, said crankshaft having cam means disposed thereon having a journal at each end thereof, each of said journals being offset from the crankpin adjacent thereto, a pair of blocks mounted for sliding along a predetermined path, each of said blocks being pivotally connected to a different one of the journals of said crankshaft, the paths of travel of each of the sliding blocks being at right angles to one another and intersecting at the central axis of the fluid displacement device, said sliding blocks upon the reciprocation of said moving piston and cylinder causing said crankshaft to rotate about its axis of rotation which extends along the central axis of the device; and a shaft for rotatively transmitting motion with respect to said device, the axis of said shaft extending along the central axis of the device, said shaft having an additional crankpin offset from the central axis and pivotally engaged with said crankshaft, said crankpin of said crankshaft having an inlet and a first opening extending from said inlet to a portion of the circumstance of said crankpin which cyclically intersects a different one of said passages of said unit extending from a different one of said moving cylinders of said unit in response to the rotation of said crankpin, said first opening being adapted to deliver fluid through said inlet to said different one of said moving cylinders, said crankpin having a second opening extending from said central cavity thereof to another portion of the circumference of said crankpin which cyclically intersects a different one of said passages in said crosshead member, said second opening being adapted to transfer fluid from said different one of said moving cylinder to said central cavity, said crankpin having a third opening extending from said central cavity thereof to a portion of the circumference of said crankpin which cyclically intersects a different one of said additional passages in said crosshead member, said third opening being adapted cyclically to transfer fluid between said central cavity in said crankpin and said additional passages of a different one of said pair of moving pistons; means actuated in response to the movement of said cam means for releasing fluid from each of said stationary cylinders; whereby an incoming charge of fluid from each of said moving cylinders can be received by the cavity of the crankpin before being admitted to each of said stationary cylinders.

42. A fluid displacement device comprising a pair of opposed stationary cylinders, a crosshead member containing a central bore, a pair of moving pistons extending in opposite directions from said crosshead member, each of said pair of pistons engaging the inner surface of a different one of said pair of stationary cylinders, and a pair of moving cylinders disposed concentrically with respect to and spaced apart from said moving pistons, said pair of moving cylinders extending from said crosshead member with the inner surface of each of said moving cylinders engaging the outer surface of a different one of said pair of stationary cylinders, the end portions of said stationary cylinders adjacent thereto serving as a pair of fixed pistons, said crosshead member having passages extending from said moving cylinders to said central bore for conducting fluid to be pumped by said moving cylinder, said crosshead and said pair of moving pistons having additional passages extending from the faces of the moving piston to said central bore; means for releasing fluid from each of said stationary cylinders at a predetermined portion of the cycle of said moving piston therein; a crankshaft having a different crankpin pivotally engaged with said central bore, said crankpin having a central cavity and traveling along a linear path in conjunction with the movement of said crosshead members with respect to said cylinders, said crankshaft having a journal at each end thereof, each of said journals being offset from the crankpin adjacent thereto, a counterweight mounted on said crankshaft adjacent each of the said ends thereof, a pair of blocks mounted for sliding along a predetermined path, each of said blocks being pivotally connected to a different one of the journals of said crankshaft, the path of travel of each of the sliding blocks being at right angles to one another and intersecting at the central axis of the fluid displacement device, said sliding blocks upon the reciprocation of said moving piston and cylinder causing said crankshaft to rotate about its axis of rotation which extends along the central axis of the device; and a shaft for rotatively transmitting motion with respect to said device, the axis of said shaft extending along the central axis of the device, said shaft having an additional crankpin offset from the central axis and pivotally engaged with said crankshaft, an additional counterweight mounted upon said shaft; said crankpin of said crankshaft having an inlet and a first opening extending from said inlet to a portion of the circumference of said crankpin which cyclically intersects a different one of said passages of said unit extending from a different one of said moving cylinders of said unit in response to the rotation of said crankpin, said first opening being adapted to deliver fluid through said inlet to said different one of said moving cylinders, said crankpin having a second opening extending from said central cavity thereof to another portion of the circumference of said crankpin which cyclically intersects a different one of said passages in said crosshead member, said second opening being adapted to transfer fluid from said different one of said moving cylinder to said central cavity, said crankpin having a third opening extending from said central cavity thereof to a portion of the circumference of said crankpin which cyclically intersects a different one of said additional passages in said crosshead member, said third opening being adapted cyclically to transfer fluid between said central cavity in said crankpin and said additional passages of a different one of said pair of moving pistons, whereby an incoming charge of fluid from each of said moving cylinders can be received by the cavity of the crankpin before being admitted to each of said stationary cylinders.

43. A fluid displacement device comprising a plurality of units disposed adjacent to one another, each of said units including a pair of opposed stationary cylinders, a crosshead member containing a central bore, a pair of moving pistons extending in opposite directions from said crosshead member, each of said pair of pistons engaging the inner surface of a different one of said pair of stationary cylinders, and a pair of moving cylinders disposed concentrically with respect to and spaced apart from said moving pistons, said pair of moving cylinders extending from said crosshead member with the inner surface of each of said moving cylinders engaging the outer surface of a different one of said pair of stationary cylinders, the end portions of said stationary cylinders adjacent thereto serving as a pair of fixed pistons, said crosshead member having passages extending from said moving cylinders to said central bore for conducting fluid to be pumped by said moving cylinder, said crosshead and said pair of moving pistons having additional passages extending from the faces of the moving piston to said central bore; means for releasing fluid from said stationary cylinders at a predetermined portion of the cycle of said moving piston therein, a crankshaft having a different crankpin pivotally engaged with said central bore of each of said units, said crankpin of each of said units having a cavity and traveling along a linear path in conjunction with the movement of said crosshead members with respect to said cylinders, the cavity of the crankpin of each of said units being connected to the cavity of the crankpin adjacent thereto; a shaft for rotatively transmitting motion with respect to said device; and means for coupling said crankpin having linear motion of at least one of said units to said shaft having rotational motion; said crankpin of each of said units having an inlet and a first opening extending from said inlet to a portion of the circumference of said crankpin which cyclically intersects a different one of said passages of said unit extending from a different one of said moving cylinders of said unit in response to the rotation of said crankpin, said first opening being adapted to deliver fluid through said inlet to said different one of said moving cylinders of said unit, said crankpin having a second opening extending from said cavity thereof to another portion of the circumference of said crankpin which cyclically intersects a different one of said passages in said crosshead member, said second opening being adapted to transfer fluid from said different one of said moving cylinder to said cavity, said crankpin having a third opening extending from said cavity thereof to a portion of the circumference of said crankpin which cyclically intersects a different one of said additional passages in said crosshead member, said third opening being adapted cyclically to transfer fluid between said cavity in said crankpin and said additional passages of a different one of said pair of moving pistons, whereby an incoming charge of fluid from each of said moving cylinders of said plurality of units can be received by the cavity of the crankpin of each of said units before being admitted to each of said stationary cylinders.

44. A fluid displacement device comprising a plurality of units disposed adjacent to one another, each of said units including a pair of opposed stationary cylinders, a crosshead member containing a central bore, a pair of moving pistons extending in opposite directions from said crosshead member, each of said pair of pistons engaging the inner surface of a different one of said pair of stationary cylinders, and a pair of moving cylinders disposed concentrically with respect to and spaced apart from said moving pistons, said pair of moving cylinders extending from said crosshead member with the inner surface of each of said moving cylinders engaging the outer surface of a different one of said pair of stationary cylinders, the end portions of said stationary cylinders adjacent thereto serving as a pair of fixed pistons, said crosshead member having passages extending from said moving cylinders to said central bore for conducting fluid to be pumped by said moving cylinder, said crosshead and said pair of moving pistons having additional passages extening from the faces of the moving piston to said central bore; means for releasing fluid from said stationary cylinders at a predetermined portion of the cycle of said moving piston therein; a crankshaft having a different crankpin pivotally engaged with said central bore of each of said units, said crankpin of each of said units having a cavity and traveling along a linear path in conjunction with the movement of said crosshead members with respect to said cylinders, the cavity of the crankpin of each of said units being connected to the cavity of the crankpin adjacent thereto, said crankshaft having a journal at each end thereof, each of said journals being offset from the crankpin and adjacent thereto, a pair of blocks mounted for sliding along a predetermined path, each of said blocks being pivotally connected to a different one of the journals of said crankshaft, the paths of travel of each of the sliding blocks being at right angles to one another and intersecting at the central axis of the fluid displacement device, said sliding blocks upon the reciprocation of said moving piston and cylinder causing the said crankshaft to rotate about its axis of rotation which extends along the central axis of the device; and a shaft for rotatively transmitting motion with respect to said device, the axis of said shaft extending along the central axis of the device, said shaft having an additional crankpin offset from the central axis and pivotally engaged with said crankshaft; said crankpin of each of said units having an inlet and a first opening extending from said inlet to a portion of the circumference of said crankpin which cyclically intersects a different one of said passages of said unit extending from a different one of said moving cylinders of said unit in response to the rotation of said crankpin, said first opening being adapted to deliver fluid through said inlet to said different one of said moving cylinders of said unit, said crankpin having a second opening extending from said cavity thereof to another portion of the circumference of said crankpin which cyclically intersects a different one of said passages in said crosshead member, said second opening being adapted to transfer fluid from said different one of said moving cylinder to said cavity, said crankpin having a third opening extending from said cavity thereof to a portion of the circumference of said crankpin which cyclically intersects a different one of said additional passages in said crosshead member, said third opening being adapted cyclically to transfer fluid between said cavity in said crankpin and said additional passages of a different one of said pair of moving pistons, whereby an incoming charge of fluid from each of said moving cylinders of said plurality of units can be received by the cavity of the crankpin of each of said units before being admitted to each of said stationary cylinders.

45. A fluid displacement device comprising a plurality of units disposed adjacent to one another, each of said units including a pair of opposed stationary cylinders, a crosshead member containing a central bore, a pair of moving pistons extending in opposite directions from said crosshead member, each of said pair of pistons engaging the inner surface of a different one of said pair of stationary cylinders, and a pair of moving cylinders disposed concentrically with respect to and spaced apart from said moving pistons, said pair of moving cylinders extending from said crosshead member with the inner surface of each of said moving cylinders engaging the outer surface of a different one of said pair of stationary cylinders, the end portions of said stationary cylinders adjacent thereto serving as a pair of fixed pistons, said crosshead member having passages extending from said moving cylinders to said central bore for conducting fluid to be pumped by said moving cylinder, said crosshead and said pair of moving pistons having additional passages extending from the faces of the moving piston to said central bore; means for releasing fluid from said stationary cylinders at a predetermined portion of the cycle of said moving piston therein; a crankshaft having a different crankpin pivotally engaged with said central bore of each of said units, said crankpin of each of said units having a cavity and traveling along a linear path in conjunction with the movement of said crosshead members with respect to said cylinders, means for connecting one portion of the cavity of the crankpin of each of said units to one another; a shaft for rotatively transmitting motion with respect to said device; and means for coupling said crankpin having linear motion of at least one of said units to said shaft having rotational motion; said crankshaft having inlet means for admitting an incoming charge to the other portion of the cavity of the crankpin of each of said units, said crankpin of each of said units having a first opening extending from said other portion of the cavity of the crankpin to a portion of the circumference of said crankpin which cyclically intersects a different one of said passages of said unit extending from a different one of said moving cylinders of said unit in response to the rotation of said crankpin, said first opening being adapted to deliver fluid through said inlet means to said different one of said moving cylinders of said unit, said crankpin having a second opening extending from said one portion of the cavity thereof to another portion of the circumference of said crankpin which cyclically intersects a different one of said passages in said crosshead member, said second opening being adapted to transfer fluid from said different one of said moving cylinder to said one portion of the cavity, said crankpin having a third opening extending from said one portion of the cavity thereof to a portion of the circumference of said crankpin which cyclically intersects a different one of said additional passages in said crosshead member, said third opening being adapted cyclically to transfer fluid between said one portion of the cavity in said crankpin and said additional passages of a different one of said pair of moving pistons, whereby an incoming charge of fluid from each of said moving cylinders of said plurality of units can be received by said one portion of the cavity of the crankpin of each of said units before being admitted to each of said stationary cylinders.

46. A fluid displacement device comprising a plurality of units disposed adjacent to one another, each of said units including a pair of opposed stationary cylinders, a crosshead member containing a central bore, a pair of moving pistons extending in opposite directions from said crosshead member, each of said pair of pistons engaging the inner surface of a different one of said pair of stationary cylinders, and a pair of moving cylinders disposed concentrically with respect to and spaced apart from said moving pistons, said pair of moving cylinders extending from said crosshead member with the inner surface of each of said moving cylinders engaging the outer surface of a different one of said pair of stationary cylinders, the end portions of said stationary cylinders adjacent thereto serving as a pair of fixed pistons, said crosshead member having passages extending from said moving cylinders to said central bore for conducting fluid to be pumped by said moving cylinder, said crosshead and said pair of moving pistons having additional passages extending from the faces of the moving piston to said central bore; means for releasing fluid from said stationary cylinders at a predetermined portion of the cycle of said moving piston therein; a crankshaft having a different crankpin pivotally engaged with said central bore of each of said units, said crankpin of each of said units traveling along a linear path in conjunction with the movement of said crosshead members with respect to said cylinders, said crankshaft having a transfer passage extending adjacent each crankpin thereof; a shaft for rotatively transmitting motion with respect to said device; and means for coupling said crankpin having linear motion of at least one of said units to said shaft having rotational motion; said crankshaft having inlet means for admitting an incoming charge, each crankpin of said units having a first opening extending from said inlet means to a portion of the circumference of said crankpin which cyclically intersects a different one of said passages of said unit extending from a different one of said moving cylinders of said unit in response to the rotation of said crankpin, said first opening being adapted to deliver fluid through said inlet means to said different one of said moving cylinders of said unit, said crankpin having a second opening extending from said transfer passage thereof to another portion of the circumference of said crankpin which cyclically intersects a different one of said passages in said crosshead member, said second opening being adapted to transfer fluid from said different one of said moving cylinder to said transfer passage, said crankpin having a third opening extending from said transfer passage thereof to a portion of the circumference of said crankpin which cyclically intersects a different one of said additional passages in said crosshead member, said third opening being adapted cyclically to convey fluid between said transfer passage in said crankshaft and said additional passages of a different one of said pair of moving pistons, whereby an incoming charge of fluid from each of said moving cylinders of said plurality of units can be received by said transfer passage before being admitted to each of said stationary cylinders.

47. A fluid displacement device comprising a pair of units disposed adjacent to one another, each of said units including a pair of opposed stationary cylinders, a crosshead member containing a central bore, a pair of moving pistons extending in opposite directions from said crosshead member, each of said pair of pistons engaging the inner surface of a different one of said pair of stationary cylinders, and a pair of moving cylinders disposed concentrically with respect to and spaced apart from said moving pistons, said pair of moving cylinders extending from said crosshead member with the inner surface of each of said moving cylinders engaging the outer surface of a different one of said pair of stationary cylinders, the end portions of said stationary cylinders adjacent thereto serving as a pair of fixed pistons, said crosshead member having passages extending from said moving cylinders to said central bore for conducting fluid to be pumped by said moving cylinder, said crosshead and said pair of moving pistons having additional passages extending from the faces of the moving piston to said central bore; means for releasing fluid from said stationary cylinders at a predetermined portion of the cycle of said piston therein; a crankshaft having a different crankpin pivotally engaged with said central bore of each of said units, said crankpin of each of said units having a cavity and traveling along a linear path in conjunction with the movement of said crosshead members with respect to said cylinders, said crankshaft having a transfer passage extending through each crankpin thereof and having a journal at each end thereof, each of said journals being offset from the crankpin adjacent thereto, said crankshaft having an intake passage extending from each journal to said crankpin adjacent thereto, a pair of blocks mounted for sliding along a predetermined path, each of said blocks being pivotally connected to a different one of the journals of said crankshaft, the paths of travel of each of the sliding blocks being at right angles to one another and intersecting at the central axis of the fluid displacement device, said sliding blocks upon the reciprocation of said moving piston and cylinder causing said crankshaft to rotate about its axis of rotation which extends along the central axis of the device; a shaft for rotatively transmitting motion with respect to each end of said crankshaft; the axis of said shaft extending along the central axis of the device, said shaft having an additional crankpin offset from the central axis and pivotally engaged with said crankshaft, said shaft having an additional intake passage extending therethrough and connected to the intake passage in said crankshaft adjacent thereto; said crankpin of each of said units having an inlet and a first opening extending from said inlet to a portion of the circumference of said crankpin which cyclically intersects a different one of said passages of said unit extending from a different one of said moving cylinders of said unit in response to the rotation of said crankpin, said first opening being adapted to deliver fluid through said inlet to said different one of said moving cylinders of said unit, said crankpin having a second opening extending from said central cavity thereof to another portion of the circumference of said crankpin which cyclically intersects said first opening, said second opening being adapted to transfer fluid from said different one of said moving cylinder to said central cavity, said crankpin having a third opening extending from said central cavity thereof to a portion of the circumference of said crankpin which cyclically intersects a different one of said additional passages in said crosshead member, said third opening being adapted cyclically to transfer fluid between said central cavity in said crankpin and to said additional passages of a different one of said pair of moving pistons, whereby an incoming charge of fluid from each of said moving cylinders of said plurality of units can be received by the cavity of the crankpin of each of said units before being admitted to each of said stationary cylinders.

48. A fluid displacement device comprising a first pair of fixed opposed pistons, a first pair of fixed opposed cylinders disposed adjacent to said first pair of fixed pistons, a second pair of movable opposed pistons, each containing a cavity, a second pair of movable opposed cylinders disposed adjacent to said second pair of movable pistons, said first pair of fixed pistons being engaged with said second pair of movable cylinders, said second pair of movable pistons being engaged with said first pair of fixed cylinders, a crankshaft having a crankpin pivotally engaged with one of said second pair of movable pistons and said second pair of movable cylinders, said crankpin being adapted to reciprocate along a line substantially parallel to the line of movement of said movable pistons and cylinders, means within said crankpin for controlling the flow of fluid with respect to said fixed and movable cylinders, said flow controlling means being in a fluid circuit with said cavities for enabling said cavities to serve as a reservoir for the flow, and means for revolving said crankshaft in response to the reciprocation of said crankpin.

49. A fluid displacement device comprising a first pair of fixed opposed pistons, a first pair of fixed opposed cylinders disposed concentrically with respect to said first pair of fixed pistons, a second pair of movable opposed pistons, each containing a cavity, a second pair of movable opposed cylinders disposed concentrically with respect to said second pair of movable pistons, said first pair of fixed pistons being engaged with said second pair of movable cylinders, said second pair of movable pistons being engaged with said first pair of fixed cylinders, a crankshaft having a crankpin pivotally engaged with said second pair of movable pistons and said second pair of movable cylinders and in response thereto travelling along a line substantially parallel to the line of movement of said movable pistons and cylinders, means within said crankpin for controlling flow into said first pair of fixed cylinders, means within said crankpin for controlling flow from said first pair of fixed cylinders to said second pair of movable cylinders, said flow controlling means being in communication with said cavities for enabling said cavities to serve as reservoirs for the flow, an external shaft adapted to be rotated, and means for converting the motion of said crankshaft in response to the movement of said crankpin to the rotational motion of the external shaft.

References Cited by the Examiner

UNITED STATES PATENTS

| | | | |
|---|---|---|---|
| 2,354,980 | 8/1944 | Arras | 103—174 |
| 2,394,285 | 2/1946 | Bevins | 103—174 |
| 3,125,034 | 3/1964 | Lucien et al. | 103—174 |

FOREIGN PATENTS

| | | |
|---|---|---|
| 453.288 | 9/1936 | Great Britain. |

MARK NEWMAN, *Primary Examiner.*

SAMUEL LEVINE, *Examiner.*

R. M. VARGO, *Assistant Examiner.*